(12) United States Patent
Daniele et al.

(10) Patent No.: US 7,612,717 B2
(45) Date of Patent: Nov. 3, 2009

(54) ULB LOCATION SYSTEM FOR RESCUING AVALANCHE VICTIMS

(75) Inventors: Norbert Daniele, Montbonnot (FR); Benoit Denis, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 145 days.

(21) Appl. No.: 11/628,620

(22) PCT Filed: Jun. 7, 2005

(86) PCT No.: PCT/FR2005/001388

§ 371 (c)(1), (2), (4) Date: Dec. 6, 2006

(87) PCT Pub. No.: WO2006/003294

PCT Pub. Date: Jan. 12, 2006

(65) Prior Publication Data

US 2007/0176826 A1 Aug. 2, 2007

(30) Foreign Application Priority Data

Jun. 7, 2004 (FR) ................................. 04 51118

(51) Int. Cl.
*G01S 3/02* (2006.01)
*H04W 24/00* (2006.01)

(52) U.S. Cl. .................................. 342/465; 455/456.1

(58) Field of Classification Search ................................. 342/357.01–357.17, 465; 455/456.1
See application file for complete search history.

(56) References Cited

U.S. PATENT DOCUMENTS

| 5,216,429 | A | | 6/1993 | Nakagawa et al. |
| 5,589,838 | A | | 12/1996 | McEwan |
| 5,661,490 | A | | 8/1997 | McEwan |
| 6,002,708 | A | | 12/1999 | Fleming et al. |
| 6,054,950 | A | * | 4/2000 | Fontana ...................... 342/463 |

(Continued)

FOREIGN PATENT DOCUMENTS

DE          26 28 193          12/1977

(Continued)

OTHER PUBLICATIONS

Srdan Capkun, et al., "GPS-free positioning in mobile Ad-Hoc networks", Proceedings of the 34th Hawaii International Conference on System Sciences, XP 008001836, 2001, pp. 1-10.

(Continued)

*Primary Examiner*—Thomas H Tarcza
*Assistant Examiner*—Harry Liu
(74) *Attorney, Agent, or Firm*—Oblon, Spivak, McClelland, Maier & Neustadt, L.L.P.

(57) ABSTRACT

A method for locating a UWB transmitter, without a previously-set reference, using at least one first set of at least three UWB searching transceivers, including first, second, and third transceivers. The method a) synchronizes the three UWB searching transceivers, arranged at three different points, and estimates the relative position of these three points; b) receives, by the three transceivers, signals transmitted by the transmitter to be located; and c) calculates the relative position, with respect to the three searching transceivers, of the transmitter to be located according to the time of travel of the signals, transmitted by the transmitter to be located, to the three searching transceivers.

31 Claims, 12 Drawing Sheets

U.S. PATENT DOCUMENTS

| | | | |
|---|---|---|---|
| 6,133,876 | A | 10/2000 | Fullerton et al. |
| 6,483,461 | B1 | 11/2002 | Matheney et al. |
| 6,489,893 | B1 | 12/2002 | Richards et al. |
| 6,504,483 | B1 | 1/2003 | Richards et al. |
| 6,784,827 | B2 * | 8/2004 | Hirt ............................ 342/42 |
| 7,200,166 | B1 * | 4/2007 | Miao .......................... 375/219 |
| 2002/0175850 | A1 | 11/2002 | Barnes et al. |
| 2002/0185556 | A1 | 12/2002 | Malsam |
| 2003/0022680 | A1 | 1/2003 | Shreve |
| 2003/0137453 | A1 | 7/2003 | Hannah et al. |
| 2003/0198308 | A1 * | 10/2003 | Hoctor et al. ............... 375/354 |
| 2004/0002346 | A1 * | 1/2004 | Santhoff ................. 455/456.1 |
| 2004/0002347 | A1 * | 1/2004 | Hoctor et al. ............ 455/456.1 |
| 2004/0075560 | A1 * | 4/2004 | Hartmann et al. ........ 340/572.1 |
| 2004/0233972 | A1 * | 11/2004 | Karaoguz .................... 375/130 |
| 2005/0058121 | A1 * | 3/2005 | Santhoff et al. ............. 370/352 |
| 2005/0058152 | A1 * | 3/2005 | Oksanen et al. ............. 370/465 |

FOREIGN PATENT DOCUMENTS

| | | |
|---|---|---|
| EP | 0 964 265 A2 | 12/1999 |
| FR | 2 783 607 | 3/2000 |
| GB | 2 387 052 A | 10/2003 |
| WO | WO 02/03091 A2 | 1/2002 |
| WO | WO 02/088776 A2 | 11/2002 |
| WO | WO 03/010553 A2 | 2/2003 |
| WO | WO 03/104837 A1 | 12/2003 |

OTHER PUBLICATIONS

James Caffery, Jr., et al., "Subscriber Location in CDMA Cellular Networks", IEEE Transactions on Vehicular Technology, vol. 47, No. 2, XP-000870833, May 1998, pp. 406-416.

"Electromagnetic compatibility and Radio spectrum Matters (ERM); Avalanche Beacons; Transmitter-receiver systems; Part 1: Technical characteristics and test methods", ETSI EN 300 718-1 v1.2.1, European Standard (Telecommunications series), May 2001, pp. 1-34.

Y. T. Chan, et al., "A Simple and Efficient Estimator for Hyperbolic Location", IEEE Transactions on Signal Processing, vol. 42, No. 8, Aug. 1994, pp. 1905-1915.

Xiong Jin-Yu, et al. "An Improved Taylor Algorithm in TDOA Subscriber Position Location", Proceedings of Int. Conf. on Communication Technology, 2003, vol. 2, Apr. 9-11, 2003, pp. 981-984.

"Ultra Wideband (UWB) Radios for Precision Location", Time Domain Corporation, pp. 1-8.

Robert Fleming, et al., "Rapid Acquisition for Ultra-Wideband Localizers", AEther Wire & Location, Inc. 2002 IEEE Conference on Ultra Wideband Systems and Technologies, Baltimore., 2002, pp. 245-249.

Robert J. Fontana, "Experimental Results from an Ultra Wideband Precision Geolocation System", Multispectral Solutions, Inc. EuroEM Geolocation, Edinburgh, May 30, 2000, pp. 1-13.

Robert J. Fontana, et al., "Ultra-Wideband Precision Asset Location System", Multispectral Solutions, Inc., 2002 IEEE Conference on Ultra Wideband Systems and Technologies, Baltimore., 2002, pp. 147-150.

Don Kelly, et al., "PulseON Second Generation Timing Chip: Enabling UWB Through Precise Timing", Time Domain Corporation, 2002 IEEE Conference on Ultra Wideband Systems and Technologies, Baltimore., 2002, pp. 117-121.

Yoshio Yamaguchi, et al., "FM-CW Radar Applied to the Detection of Buried Objects in Snowpack", Antennas and Propagation Society International Symposium, 1990. AP-S. 'Merging Technologies for the 90's' Digest., IEEE, vol. 2, May 7-11, 1990, pp. 738-741.

M. A. Fares, et al., "Phase Shift of the Electromagnetic Waves Due to Dry Snow", Southeastcon 2000., Proceedings of the IEEE, Apr. 7-9, 2000, pp. 150-153.

Takeo Abe, et al., "Experimental Study of Microwave Transmission in Snowpack", IEEE Transactions on Geoscience and Remote Sensing, vol. 28, No. 5, Sep. 1990, pp. 915-921.

W. Zang, et al., "Calculation of Attenuations and Phase Shifts Due to Melting Layer", Antennas and Propagation, 1991. ICAP 91., Seventh International Conference on (IEE), Apr. 15-18, 1991, pp. 836-839.

Jose Tobarias, "Dielectric Properties of Snow", Thesis presented before the Institut National Polytechnique de Grenoble, on, 1977, 84 Pages.

Wei Zhang, et al., "Predictions of Radiowave Attenuations Due to a Melting Layer of Precipitation", IEEE Transactions of Antennas and Propagation, vol. 42, No. 4, Apr. 1994, pp. 492-500.

* cited by examiner

ULB LOCATION SYSTEM FOR RESCUING AVALANCHE VICTIMS

TECHNICAL FIELD AND PRIOR ART

This invention relates to a GPS-free system (GPS for "Global Positioning System") including a set of UWB transceiver modules and making it possible to identify the positioning of avalanche victims quickly and with satisfactory precision. Such an application concerns primarily groups of off-slope skiers, cross-country skiers or hikers, snowshoers, ice climbers and mountaineers. A single system enables one or more victims to be signalled, to be detected and then located under the snow, and one or more rescue workers (bystanders, organised or members of the touring group) to lead an independent search campaign to find the victims quickly.

The means for finding a person completely trapped under the snow have long been limited to avalanche rescue dogs and probes. Given its prospecting speed (1 hectare in 10 to 20 min), the dog is currently the most effective means for quickly locating an uncooperative victim.

These two techniques can be implemented only by external rescue workers; it is therefore necessary first to notify the rescue workers and wait for them to arrive at the site. This time delay (alert and dispatch of rescue workers) is often too long with regard to the chances of survival of an avalanche victim. Consequently, probes and dog rescue teams usually enable only dead victims to be found.

Various systems for rescuing avalanche victims have therefore been studied in order to increase the chances of survival of victims. These systems can be classified into two major categories:
  systems not using electromagnetic waves,
  systems based on the use of electromagnetic waves.

Among the latter, the most widely known and system today unanimously recognised (Union of guides and tour managers, the French national ski and mountaineering school (ENSA), the French national association for the study of snow and avalanches (ANENA), the French alpine club (CAF), the French mountain and climbing federation (FFME), etc.) as the most effective is an active system developed in the nineteen seventies. It is the ARB (Avalanche Rescue Beacon) (in French, ARVA for "Appareil de Recherche de Victimes en Avalanches" or DVA for "Dètecteur de Victimes d'Avalanche", or, in German, LVS for "Lawinen Vers-chüttteten Suchgeräte").

This system implements an electromagnetic transmitter-receiver. In the transmission, the ARB creates an electromagnetic field intended to be detected by the dipole antenna of a receiving apparatus. The latter transforms the signal received, after amplification, into a sound signal. The analysis of this beep makes it possible to provide information on the relative position of the victim to be rescued. The schematic diagram of the ARB is represented in FIG. 1. The device comprises an antenna 2, a transmitter 4 (at 457 kHz), attenuators 12 and a receiver 6. The assembly is powered by batteries 10. The switchover between transmission and receiving is performed with a simple switch 3. In the receiving position, the signal issued by the antenna 2 is applied to an array 12 of attenuators that the user manipulates according to the intensity of the sound that he/she hears, by a loudspeaker 8, therefore according to its relative distance from the victim. The closer the user is, the more the user increases the attenuation in order to be capable of detecting the variations in intensity. In the newest generations of so-called "digital" apparatuses, the switching is performed automatically. The searching principle is therefore based on variations in sound intensity.

The antenna 2 of the ARB consists of a coil wound on a ferrite. When a link is established, the maximum intensity is obtained when the transmission and receiving antennas are parallel. The orientation of the ARB is therefore crucial, and the user must adapt the orientation of the device in each phase of the search. This is far from natural for anyone unfamiliar with the radiation pattern of a dipole.

The ARB uses a very simple OOK-type modulation (OOK for "ON/OFF Keying") applied directly to a carrier at 457 KHz. In state "1", the carrier is on, while in state "0", it is off.

In the reception, after a simple mixing with a reference frequency offset by a few KHz with respect to the carrier frequency of 457 KHz, and after amplification, the receiver directly generates beeps over audible frequencies that are applied to a loudspeaker or earphones.

The current search method using the ARB is carried out in three phases:
  The search for the $1^{st}$ signal (primary): after switching into reception on the channel with the maximum range, this phase consists of scanning the avalanche area using the ARB. Given the limited range of the apparatus (typically from 20 to 40 m), this phase can be relatively long if the avalanche covers a large surface, and of course if few rescue workers are working on the area. In this way, various diagrams for covering the area are applied according to the number of rescue workers.
  The secondary search: a signal having been detected, this phase can be carried out according to two distinct methods:
    the cross-method, which is systematic but laborious, and
    the method of following the field lines is faster and tends to be widespread. The ellipses constituted by the field lines obviously do not correspond to the shortest path for reaching the victim. Moreover, walking in an avalanche slough is made very difficult by the presence of holes and blocks, and it is necessary to think about preserving the orientation of the apparatus without forgetting to change the receiving ranges for optimising the receiving channel, all in a stressful situation.
  The final search: in this phase, the minimum range is used (highest attenuation corresponding to the shortest measurable distance). Moreover, it is necessary to change the orientation of the ARVA, and use a cross method close to the ground. If the victim's apparatus is perpendicular to that of the rescue worker, then two field maxima appear, and it is necessary to dig between these two maxima. A classic error consists of stopping at the first maximum and digging in the wrong place. The greater the depth, the farther apart these maxima are and the greater risk there is if the rescuers stop at the first maximum.

The ARB is a relatively basic solution (based on radio techniques of the nineteen seventies) and its use is very restrictive. Moreover, specific training is required for handling the equipment and for the search method. The training is generally provided at ski and mountain clubs, but this represents only a small portion of mountain enthusiasts. What are the chances of survival of monitors and guides in real avalanche situations, when they are accompanied by clients who, in most cases, learn how to handle the ARB on site.

As everyone knows, time is precious in the context of rescuing the victims. By way of example, studies have made it possible to estimate that the probability of survival of a victim buried is greater than 93% if the rescue workers intervene in less than 15 minutes. Between 15 and 45 minutes, there is a rapid decrease in the probability of survival from 93% to 26%. This sudden decrease clearly shows that everything depends upon the first 30 minutes, and makes it possible to show the importance of immediate rescue efforts by the touring companions. For a person experienced in handling the ARB, the location of the first victim takes between 5 and 10 min (not counting the extraction phase using the shovel). In the case of more than one victim or for untrained people, the fatal quarter of an hour is usually exceeded. Clearly, to reduce the fatality rate, the methods for rescuing avalanche victims must be improved and in particular accelerated.

More recently, the concept of DETAV (for DETection of Avalanche Victims) was introduced. It consists of a sensor making it possible to automatically detect a person buried under an avalanche so as to provide an alert, locate the person or activate a device making it possible to prolong the survival time.

DETAV measures, using sensors, parameters making it possible to determine whether the person is in danger, such as immobility by means of an accelerometer and the presence of snow by means of optical proximity sensors.

The measurement of the physiological state is therefore performed indirectly by the ability, or not, to activate an alert cancellation button. In the case of burial, this inability confirms immobilisation. All of the information is then collected and analysed by a microcontroller, which provides the interface with all other equipment, for example, by causing the activation of a GSM call. This principle is not viable as such for locating the victims, given the inadequacies of GSM technology and radio coverage.

In addition, there is the problem of finding a solution that overcomes the inadequacies of the existing systems, and making it possible to respond satisfactorily to the requirements of the search for victims, and in particular to quickly and simultaneously find multiple buried victims, without an infrastructure, or with a reduced infrastructure (i.e. set reference points, and/or centralised computing resources).

Such a device must preferably have an adequate range for covering a typical operational theatre (e.g. an area of 1000 $m^2$ to 10,000 $m^2$); in addition, it must be portable, reliable, heavy-duty, and preferably of low energy consumption, so as to ensure the longevity of its good operation and sufficient self-containedness.

The complete device must have a test mode. At any time, it must be possible to test the successful operation in transmission and reception of each unit, as well as the validity of the data exchanged between the units. Experience indeed shows that if this test is not facilitated, it may be neglected by potential users.

The device must perform sufficiently in each of the three phases of the search for buried victims (primary, secondary, final).

The device must be user-friendly and easy to use with the smallest possible number of search phases.

The device should, if possible, be capable of providing the rescue workers with information on the victims' state of health. The proposed invention makes it possible to save a few precious minutes in this race against time and provides a solution that is easy to implement and that does not require any specific training.

DESCRIPTION OF THE INVENTION

This invention relates first to a method for locating a UWB transmitter by means of at least one first UWB searching transceiver set, comprising:

A) a step of synchronising the UWB searching transceivers (at least three) arranged at different points, and of estimating the relative distance between these points, B) a step of receiving, by the transceivers, signals transmitted by the transmitter to be located, C) a step of calculating the relative position of these points, then calculating the position of the transmitter to be located according to the duration between the time of arrival of the signals transmitted by the transmitter to be located at the searching transceivers and a reference time common to said transceivers.

It is possible to have a previously defined area of interest, for example an area of accumulation of snow resulting from an avalanche, or a building or land, or containing a building or land, the UWB transmitter to be located being situated in said area.

The searching transmitters are then positioned in this area of interest, advantageously at a distance from one another.

The invention therefore also relates to a method for locating a UWB transmitter by means of at least one first set of UWB searching transceivers, comprising a preliminary step of defining an area of interest, for example an area of accumulation of snow resulting from an avalanche, or a building or land, or an area containing a building or land, the UWB transmitter to be located being situated in said area, and of positioning the transmitters in said area of interest, advantageously at a distance from one another, then:

A) a step of synchronising said UWB searching transceivers, arranged at different points, and estimating the relative distance between these points, B) a step of receiving, by the transceivers, signals transmitted by the transmitter to be located, C) a step of calculating the relative position of these points, then calculating the position of the transmitter to be located according to the duration between the time of arrival of the signals transmitted by the transmitter to be located at the searching transceivers and a reference time common to said transceivers.

Such a method does not require reference points previously set on the scene to be investigated and of which the positions are known beforehand, unlike the method and device of the prior art.

Step A can comprise the following sub-steps:
synchronisation of the transceivers,
deployment, on an occasional scene, of transceivers,
estimation or calculation of the relative distance between the transceivers.

After deployment, two of the transceivers remain stationary.

Preferably, the UWB signals used are in a frequency range below 1 GHz.

The pulse frames used and transmitted typically comprise a synchronisation preamble, a delimitation of the preamble, and then useful data.

Before step A, a preliminary step of synchronisation of the searching transceivers, in an attached state, may have taken place.

There is thus an absolute synchronisation reference.

In the searching phase, each searching transceiver can implement one or more observation windows each corresponding to a distance range, all of the distance ranges being capable of covering a total distance range between 0 and a few hundred meters, for example 500 or 700 m.

Steps A, B and C can be repeated, in order to update the position of the transceiver to be located, in particular when one of the searching transceivers is moved with respect to the other two. At least two transceivers are then stationary, while at least one is mobile.

The calculation step can make it possible to provide a position of the transceiver to be searched for in a two-dimensional surface.

During step A, the estimation of the relative position of the points can implement a cost function minimisation calculation, according to the maximum likelihood criterion.

One of the transceivers can, in step B, be moved with respect to the others.

At least one of the searching transceivers can be mobile, and the others stationary, or at least one of the others stationary.

According to one embodiment, a method according to the invention comprises:
- the transmission, by a first transceiver, of a reference signal, and the reception thereof by the others, for example a second and a third transceiver,
- the reception, by the searching transceivers, of signals transmitted by the transceiver to be located,
- the transmission, to the first transceiver, of information relating to the transit time of the reference signal and to the duration between a reference time common to the searching transceivers and the time of arrival at the level of said transceivers, of the signals transmitted by the transceiver to be located.

The synchronisation step A can comprise:
- the transmission of a reference signal from the first transceiver to the other transceivers,
- the estimation by the other transceivers of the transit time of the reference signal to themselves (TR1R2, TR1R3).

A method according to the invention can also comprise, between steps B and C:
- the estimation by the n transceivers, respectively of n durations (TV1R1, TV1R2, TV1R3) between a reference time common to the transceivers and the time of arrival of the signals transmitted by the transmitter to be located,
- then the transmission, to one of the transceivers, of the transit times and durations previously estimated.

Advantageously, a method according to the invention comprises:
- the transmission, by a second transceiver to the other transceivers, of a signal comprising at least:
- the second duration (TV1R2) corresponding to the signals transmitted by the transmitter to be located and received by the second transceiver,
- and the second transit time of the reference signal (TR1R2),
- the estimation, by a third transceiver, of a third transit time (TR2R3) from the second transceiver to the third transceiver, equal to the transit time of said signal transmitted by the second transceiver.

Such a method may also comprise the calculation or estimation, by the first transceiver, of a transit time (TR2R1) from the second transceiver to the first transceiver, equal to the transit time of said signal transmitted by the second transceiver to the first transceiver.

The method can also comprise:
- the transmission by the third transceiver, to at least the first transceiver, of a signal, comprising at least:
- the third transit time (TR2R3) from the second transceiver to the third transceiver,
- the third duration (TV1R3) relative to the signals transmitted by the transmitter to be located and received by the third transceiver,
- and the third transit time of the reference signal (TR1R3) from the first transceiver to the third transceiver.

A calculation or an estimation, by the first transceiver, of a transit time (TR3R1) from the third transceiver to the first transceiver, equal to the transit time of said signal transmitted by the third transceiver to the first transceiver can also be provided.

An additional transceiver can be used, synchronised with the first transceiver set and positioned with respect to said transceivers.

At least one transceiver can therefore be added to the first set of searching transceivers and be involved in the location method defined by steps A, B and C defined above.

Immediate involvement of the new transmitter is preferably ensured. This can be by the nature of the signals transmitted, comprising, for each frame, a synchronisation preamble. It is then synchronised with the other transceivers simultaneously or almost simultaneously to its involvement in the location operation.

According to an example, this new transceiver is part of a second set of transceivers, for example with three transceivers.

The first set of transceivers can consist of three, with the additional transceivers being a fourth transceiver.

A method according to the invention can thus comprise:
- the transmission, by the first transceiver, of a reference signal,
- the reception, by the four searching transceivers, of signals transmitted by the transceiver to be located,
- the transmission, to the first transceiver, of information relating to the transit times of the reference signal and signals transmitted by the transceiver to be located.

The synchronisation step A comprises, for example:
- the transmission of a first reference signal from the first transceiver to the second, third and fourth transceivers,
- the estimation or the calculation, by the second, third and fourth transceivers, of the transit times of the reference signal to the second, third and fourth transceivers (TR1R2, TR1R3, TR1R1').

Such a method can also comprise:
- the transmission, by the fourth transceiver, of a second reference signal,
- then the transmission, by the first transceiver, of a third reference signal,
- the calculation, by the first and fourth transceivers, of an amount representative of a two-way transit time of a signal transmitted by each of the first and fourth transceivers, according to the transit time from the fourth to the first transistor (TR1'R1) and from the first transceiver to the fourth transceiver (TR1R1').

Between steps B and C, the following can be performed:
- the calculation by the first, second, third and fourth transceivers, respectively, of a first, a second, a third and a fourth duration (TV1R1, TV1R2, TV1R3, TV1R1') between a common reference time and the time of arrival of signals transmitted by the transmitter to be located,
- then the transmission, to the first transceiver, of second, third and fourth durations between a common reference time and the time of arrival of signals transmitted by the transmitter to be located.

This method can also consist of:
- the transmission, by the fourth transceiver to the first, second and third transceivers, of a signal comprising at least the fourth duration (TV1R1') between a common reference time and the time of arrival of signals transmitted by the transmitter to be located,
- the calculation or estimation, by the first, second and third transceiver, respectively, of a fourth, fifth and sixth transit time (TR1'R1, TR1'R2, TR1'R3) from the fourth to the first (20), second and third transceiver, equal to the transit time of said signal transmitted by the fourth transceiver.

This method can also consist of:

the transmission, by the second transceiver to the first, third and fourth transceivers, of a signal comprising at least:

the second duration between a common reference time (TV1R2) and the time of arrival of signals transmitted by the transmitter to be located, and the fifth transit time (TR1'R2), the calculation or estimation, by the first, third and fourth transceivers, respectively, of a seventh, eighth, and ninth transit time (TR2R1, TR2R1', and TR2R3) from the second transceiver, respectively, to the first, fourth and third transceivers, equal to the transit time of said signal transmitted by the second transceiver to each of the first, third and fourth transceivers.

The following can also be performed:

the transmission, by the third transceiver to the first, second and fourth transceivers, of a signal comprising at least:

the third duration between a common reference time and the time of arrival (TV1R3) of signals transmitted by the transmitter to be located, the sixth transit time (TR1'R3), and the ninth transit time (TR2R3), the calculation or estimation, by the first, second and fourth transceiver, respectively of a tenth, eleventh, and twelfth transit time (TR3R1, TR3R1', and TR3R2) from the third transceiver, respectively, to the first, fourth and second transceivers, equal to the transit time of said signal transmitted by the third transceiver to each of the first, fourth and second transceivers.

The fourth transceiver can be part of a second set of three transceivers.

To optimise the search, a second set of at least three transceivers can implement steps A, B and C of the method above, in parallel, or independently, with respect to the first set.

When the transceiver to be located is buried under the snow, a correction can be made in order to take into account delays in the time of arrival due to the propagation of signals in the snow.

The invention also relates to a device for locating a UWB transceiver, comprising:

at least three searching transceivers, each comprising UWB signal transceiver means, means for calculating the position of a transmitter to be located according to the transit time of signals transmitted by said transmitter to be located to the three searching transceivers, display means for indicating at least the position of the transmitter to be located with respect to that of the three searching transceivers.

Preferably, the three transceivers are attached in the resting position, and are capable of being detached when locating a UWB transmitter.

Such a device can comprise means for synchronising the three transceivers.

Means can be provided for synchronising the three transceivers in the attached state.

Means can also be provided for synchronising the three transceivers in the detached state.

The means for calculating the position of a transmitter to be located and the display means can advantageously be part of one of the three transceivers.

The invention also relates to a device for locating a UWB transceiver, comprising at least three searching transceivers, programmed to implement a method as described above.

A device according to the invention can be produced with CMOS or BiCMOS technology.

This invention implements a low-bandwidth UWB radio link to locate avalanche victims.

More specifically, the invention can use either the high band or the low band of the RF spectrum (for example from 10 to 960 MHz, with a spectral power density of −41 dBm/MHz), allocated to UWB systems by the official regulating organisations (FCC for "Federal Communications Commission) for "outdoor" applications and penetrating radar-type security applications.

In the low frequency range, the penetration of materials, snow in this context, by the electromagnetic waves is particularly favourable and makes it possible to systematically ensure, by transmission, the presence of a direct path corresponding to the geometric path ("line of sight"), significantly reducing the error over relative estimated distances due to the propagation channel, and consequently the final error on the estimated position of the victim(s) to be rescued.

In addition, the invention makes use of the ability of UWB systems to hybridize low bandwidth digital radio transmissions and the location functions.

According to an embodiment, sensors can be positioned on the body of the victims, which sensors make it possible to collect and relay, to the rescue workers, via a UWB radio link, information such as the physiological state and the vital parameters of the potential victims.

According to this invention, it is therefore possible to achieve an almost instantaneous, two-dimensional (reconstruction of a relative two-dimensional topology) and sufficiently accurate positioning of UWB devices buried in the snow, in the absence of infrastructures or stationary reference points equipped with GPS modules, or points georeferenced by any other means.

In this way, the present invention is based, on the one hand, on a self-contained UWB communication system allowing for a precise detection of the time of arrival of pulses transmitted, a precise synchronisation of devices, and the transmission of information that is useful in the search, such as the identifier and, possibly, information relating to the physical state of the victims, and, on the other hand, conventional passive location techniques for the positioning of said victims.

DETAILED DESCRIPTION OF EMBODIMENTS OF THE INVENTION

The present invention will hereinafter be referred to by the acronym ALVA (for Apparatus for Locating Victims of Avalanches).

Figure 1:
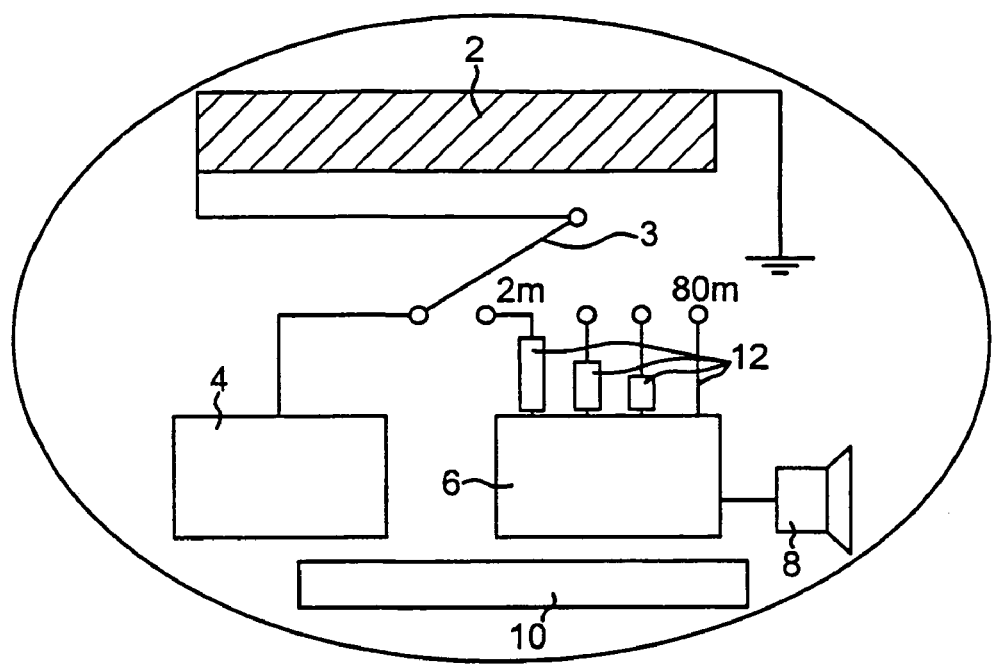
FIG. 1 diagrammatically shows a device of the prior art.
Figure 2A:
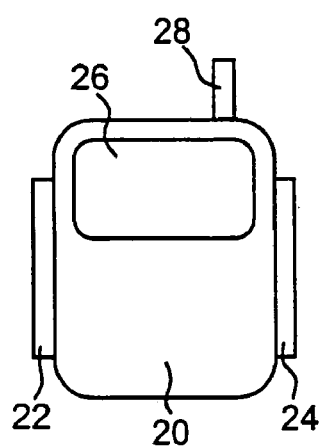
FIGS. 2A and 2B show a device according to the invention.
Figure 2B:
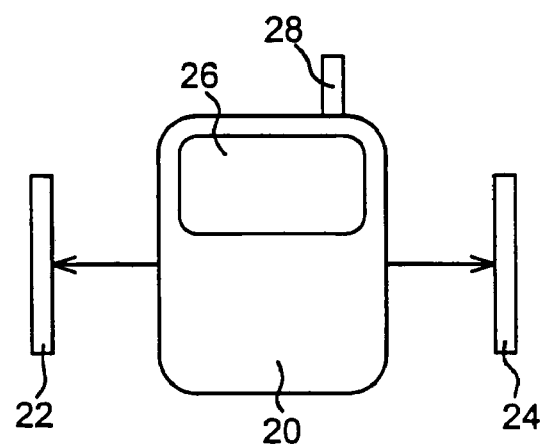

As shown in FIGS. 2A and 2B, a device according to the invention is in the form of a set of UWB transceiver modules 20, 22, 24, for example three modules, but the invention can also be carried out with a number n≧3 transceivers.

These modules are preferably initially attached to one another. At rest, i.e. in standby mode, only one of the modules, preferably module 20, can be active in transmission mode, with the others being inactive.

If a search procedure is initiated, the device is switched to search mode, and the modules that were initially inactive are in particular activated. The initial attachment of the modules can allow for an immediate synchronisation of the references of these modules at this stage.

The n modules (for example, 3) are then detached (FIG. 2B) so as to form a set of n reference points allowing for a two-dimensional positioning of the victims.

The device 20 preferably centralises the information and the calculations during the search and coordinates the procedure. It comprises a display screen 26 and an antenna 28, and is responsible for collecting and centralising the information coming from the other modules (modules 22, 24), as well as the calculation of the positions.

A module 20 is carried by the rescue worker during the phase of searching for the victim. A UWB transmitter is also carried by the victim. This transmitter can advantageously be the active module (in transmission) of another ALVA at rest (in standby mode).

This main module 20 includes a low-bandwidth UWB transceiver as well as an LCD screen 26 that makes it possible to display, in real time, coordinates of the unknown points during the search (position of reference points and position of unknown points to be located).

By default, i.e. when the ALVA is not in search mode, the transmitter of this module is active and makes it possible to transmit a signal including, among other things, information specific to the carrier (identifier, possibly the state of health of the carrier, etc.).

Figure 3:
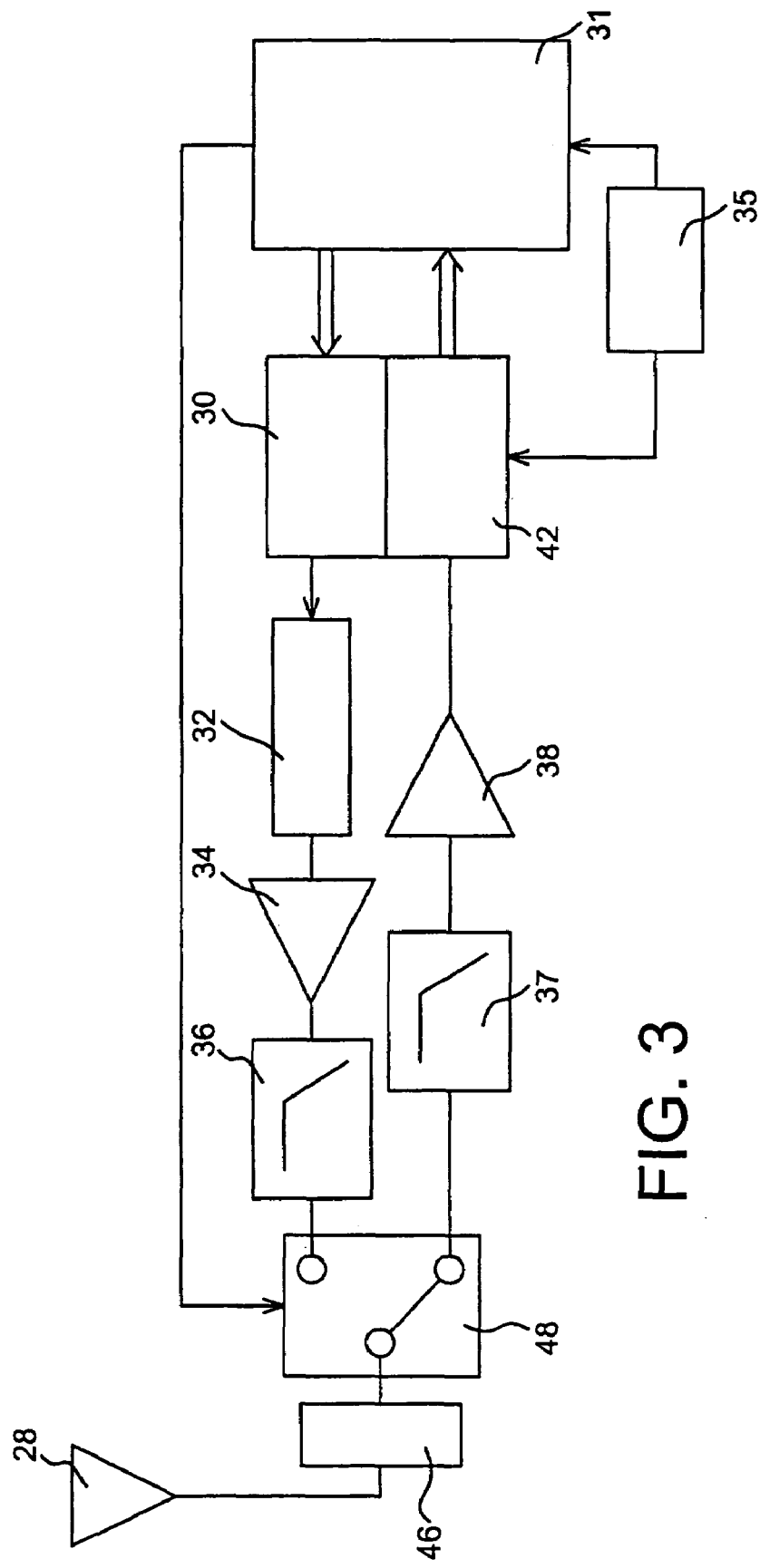
FIG. 3 diagrammatically shows an example of an embodiment of a device according to the invention.

An example of an embodiment of the transceiver based on an almost "all digital" approach, which can easily be integrated in CMOS or BiCMOS silicon technologies, is shown in FIG. 3. Analogue architectures using mixers or energy detectors are also applicable.

The transmitter comprises a parallel to serial converter 30 directly inputting the data to be transmitted. A derivator (filter) makes it possible to format the pulses in order to comply with the FCC mask. An amplifier 34 makes it possible to increase the transmission power, if necessary. A filter 36 makes it possible to suppress any parasitic lines due to the amplification.

At the receiving side, filtering means 37 make it possible to limit the main interferences of the HF, VHF and UHF services.

A low noise amplifier 38 makes it possible to improve the noise factor of the receiver. The pulses received are then sampled and converted to N bits. The analog to digital conversion function can be performed with a single fast converter 42 or with an array of M converters, M times slower. A shared filter 46 can be placed in front of the transceiver switch 48, itself controlled by digital processing means 31. A clock signal 35 is provided in the converter 42 and the digital processing means 31.

Such a device satisfies the constraints of cost, energy consumption, flexibility and bulk.

The signal transmitted by the means 20 is, for example, a train of Gaussian pulses encoded in direct sequence. The modulation used can be of the BPSK-type ("Bi Phase Shift Keying"), of the PPM-type ("Pulse Position Modulation") or of the OOK-type ("On-Off Keying"). This is to comply with the mask provided by the regulating organisations.

Figure 4A:
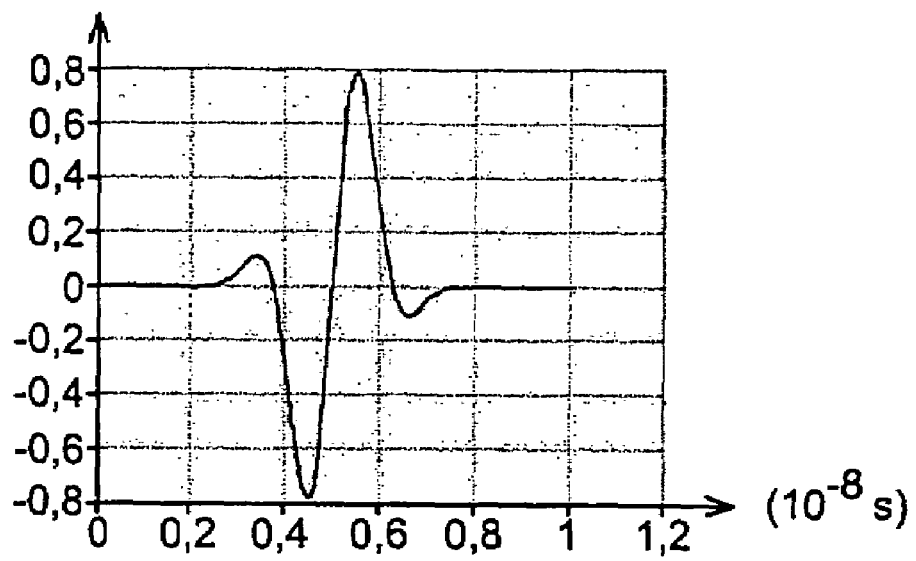
FIGS. 4A and 4B show signals that can be used in the context of the present invention.

FIG. 4A provides an example of a time waveform that can be used in the context of this invention.

Figure 4B:
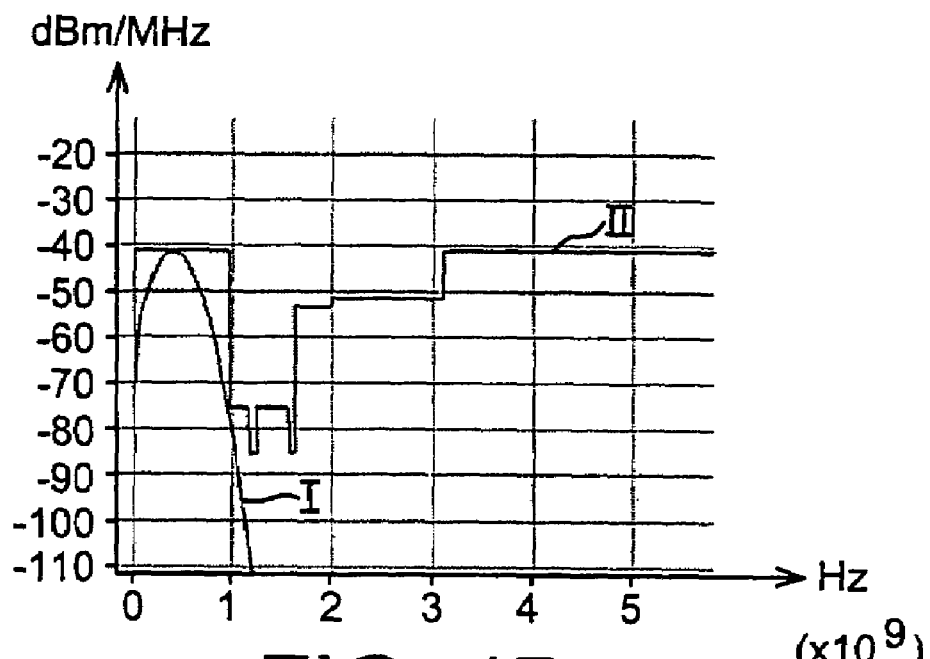

FIG. 4B also shows the associated spectral power density (curve I), in dBm/MHz, in accordance with the transmission mask (curve II) authorised by the FCC.

Figure 5:
FIG. 5 shows a frame of a signal capable of being used in the context of the present invention.

The signal transmitted can be transmitted in the form of frames. Below, we will use the term "signal" to designate a frame. An example of a frame format is shown in FIG. 5. Each frame thus includes:

a preamble (P), itself consisting of a train of encoded and unmodulated pulses, dedicated to the synchronisation and estimation of the propagation channel, a delimitation of the preamble (PD), composed of the same pulse sequence as the sequence used for the preamble, but with a clearly identifiable variant (for example a polarity reversal), useful data (D) consisting of encoded and modulated pulse trains.

An example of a search procedure will now be described in association with FIGS. 6 to 9.

Figure 8A:
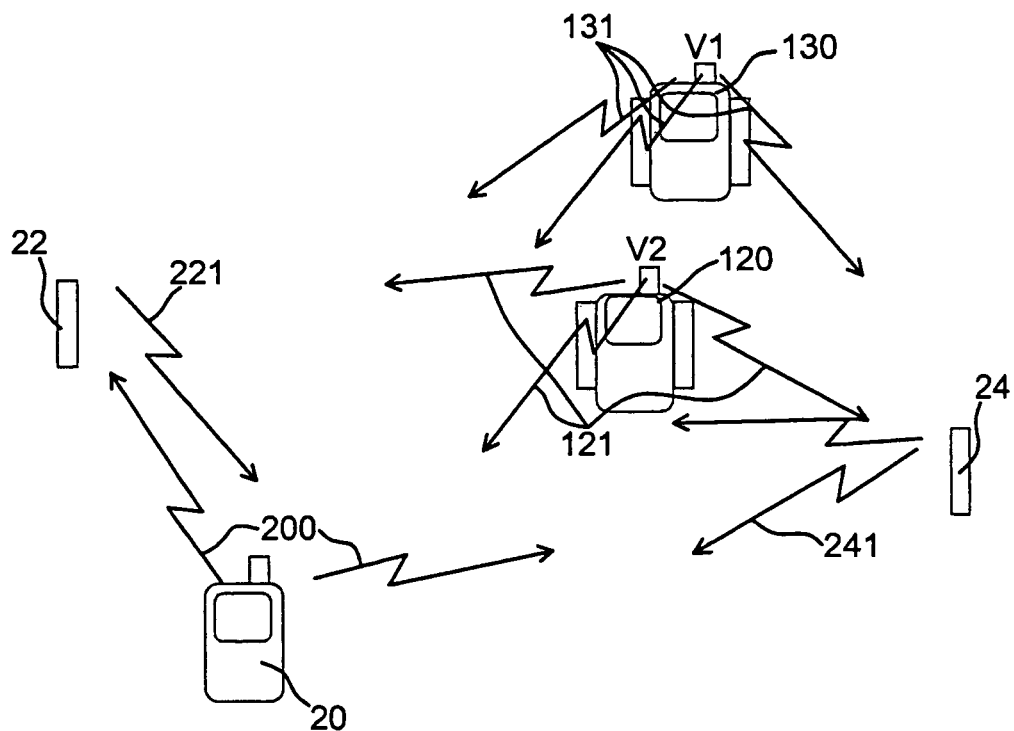
FIGS. 8A and 9 show the various phases of a method according to the invention.
Figure 8B:
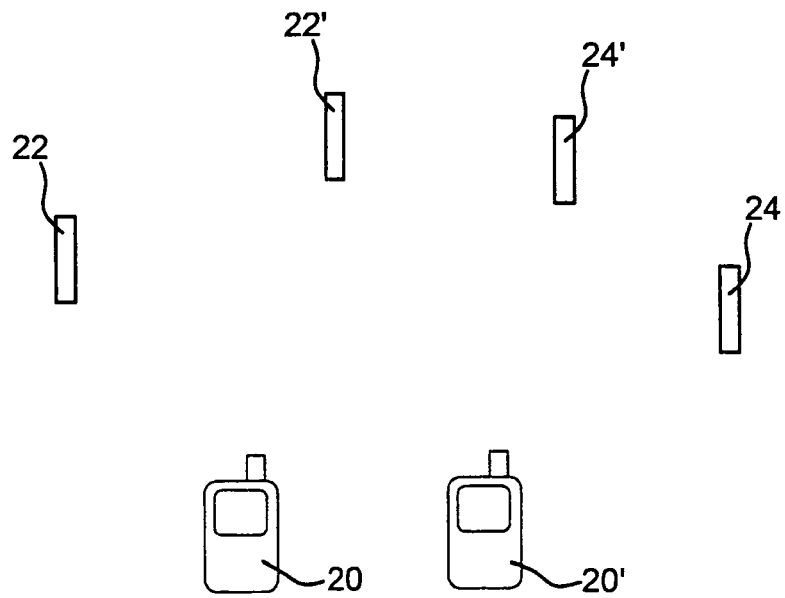
FIG. 8B shows two searching assemblies according to the invention, in parallel searching mode.

FIG. 8A shows, in addition to the device 20, modules 22 and 24 in a position separated from the central device 20, as well as devices 120 and 130 of two victims V1 and V2, for example two people buried under the snow.

If the carrier of a complete device 120 is buried under an avalanche, the module 120 of the buried device continues to transmit a reference signal matching the aforementioned frame and therefore including a-preamble (P), intended for the synchronisation and estimation of the channel, then data relating to the carrier of said module (identifier, possibly the state of health, etc.)

This reference signal, which is transmitted periodically, makes it possible to provide a location of the victim when it is detected by any other complete system, such as the set of n (for example, n=3) modules 20, 22, 24, switched to search mode (carried by an equipped member of the touring group and/or by the institutional rescue workers dispatched to the site, or by any other equipped rescuer nearby). The victim thus has nothing in particular to do.

The spreading sequences used by default in the transmission by all of the devices are therefore identical and considered to be universal.

The location of victims can be carried out in the following way, shown in FIGS. 6, 7A, 8A and 9.

After activation of the search procedure, there is the transmission of a Synchronisation signal by module 20 in the grouped state of the device i.e. in the state illustrated in FIG. 2A.

Figure 6:
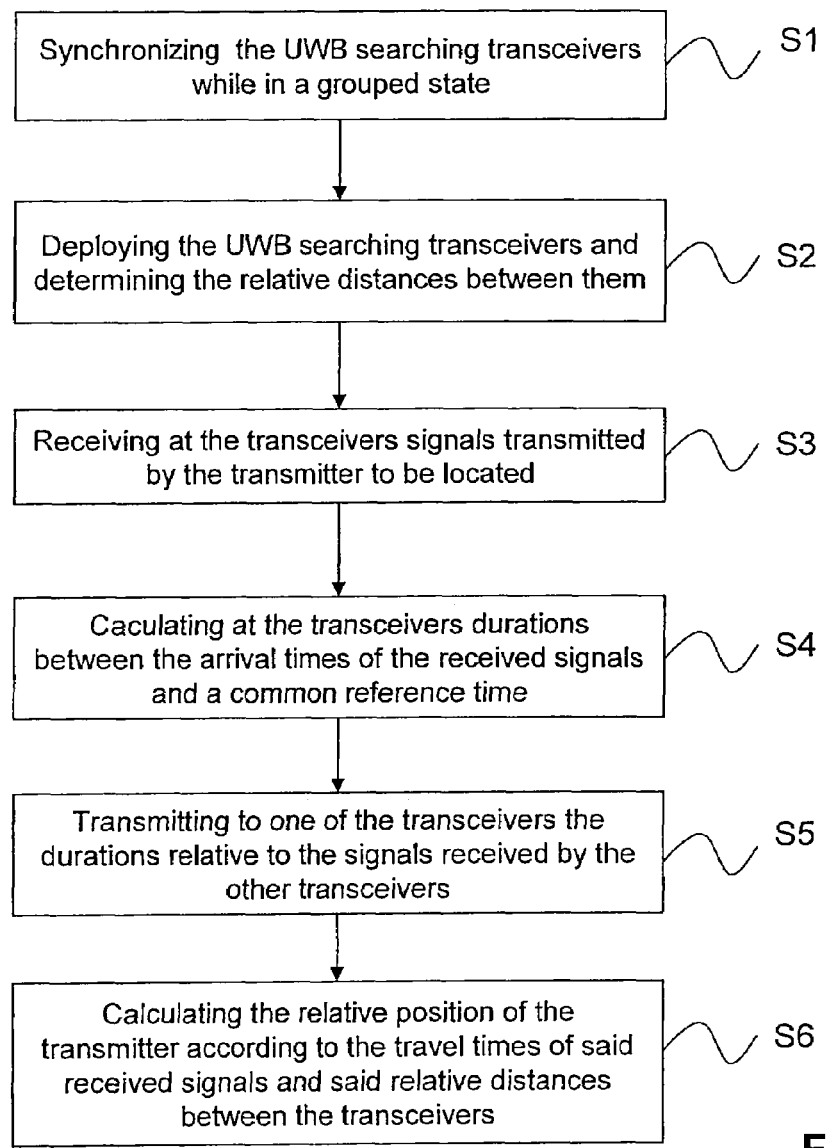
FIG. 6 diagrammatically shows the steps of a method according to the invention.

The synchronisation signal is recovered by modules 22 and 24, which are therefore strictly synchronised with module 20 (FIG. 6, S1).

Modules 22 and 24 are detached from module 20, and deployed on the searching area (FIG. 6, S2), possibly by simply throwing the modules on the ground or on the snow. They then remain immobile during the search.

Figure 7A:
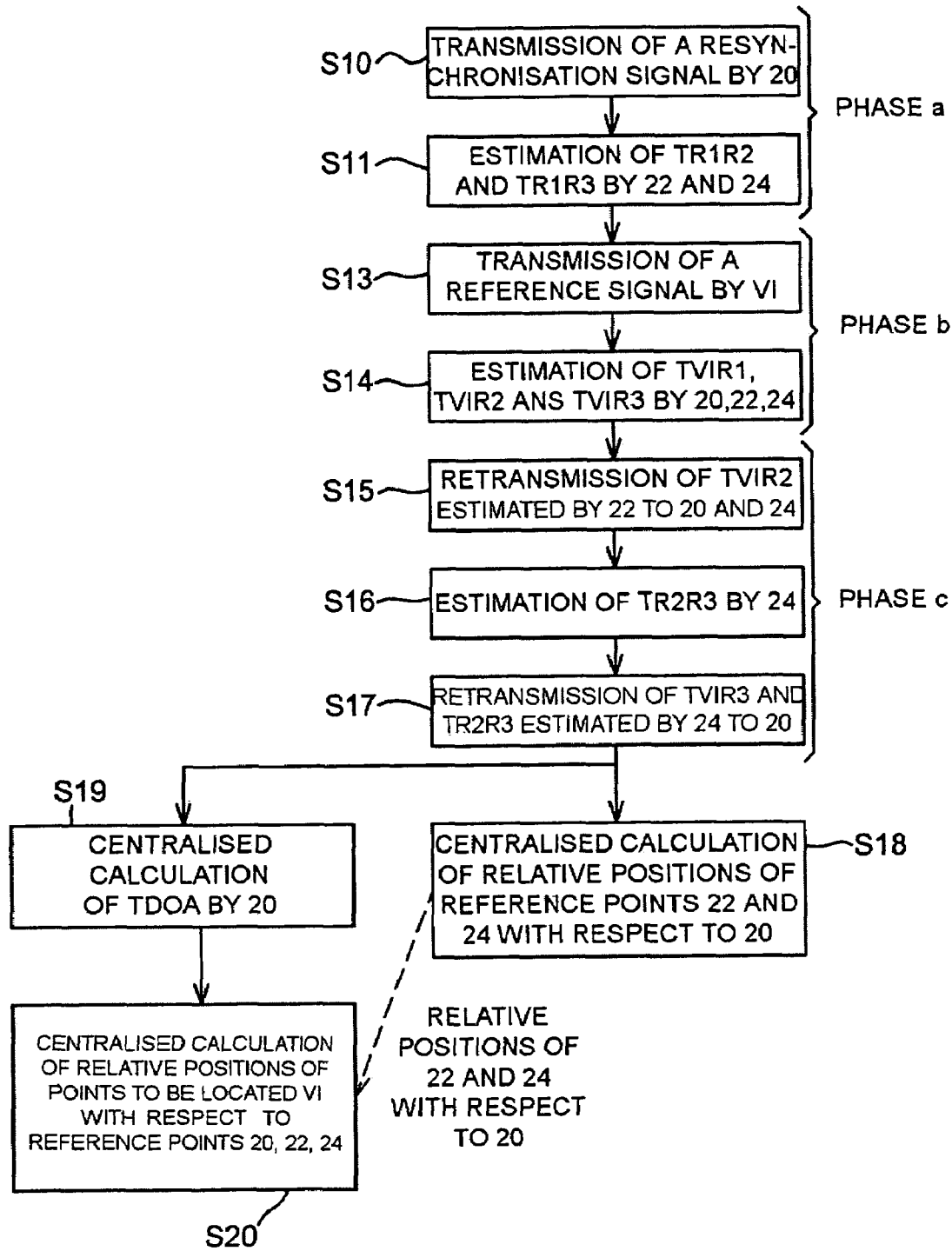
FIG. 7A is a diagrammatic description of a method according to the invention, in the case of a single rescue worker.
Figure 9:
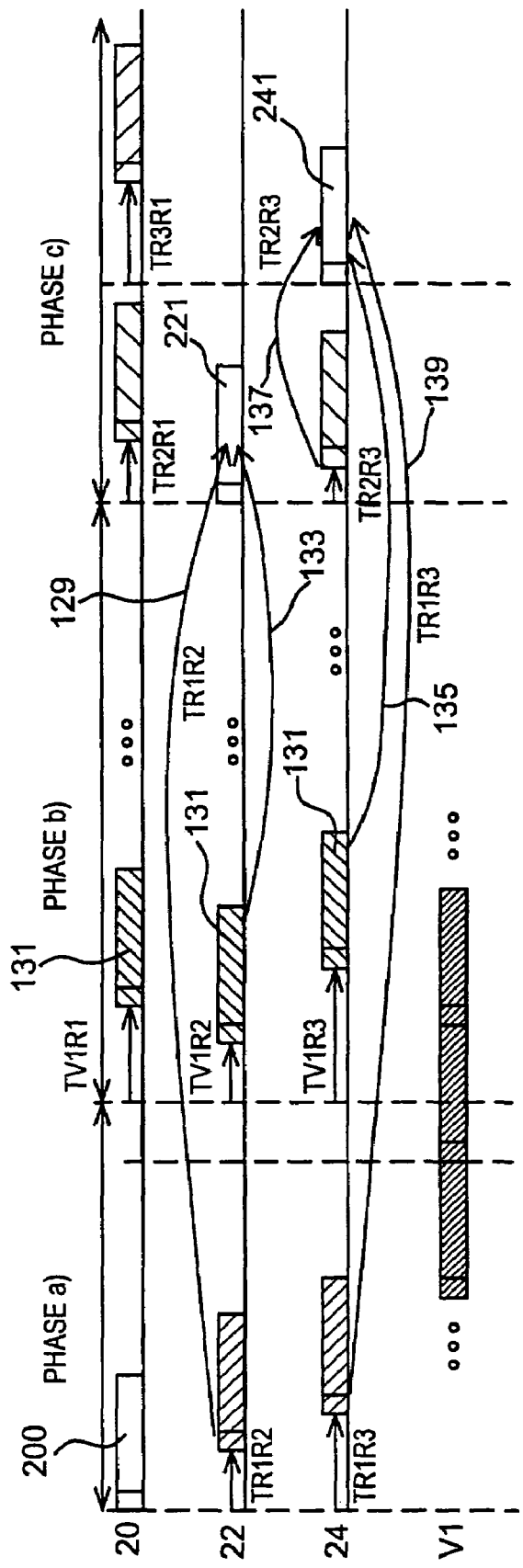

Module 20 then transmits a reference signal 200 with a universal spreading sequence (phase a of FIG. 9; FIG. 7A: S10), which is received by modules 22 and 24.

The universal spreading sequence is advantageously different from the sequence used by the victim.

Each of the modules 22 and 24 estimates the time of arrival of said signal and deduces therefrom the transit time TR1R2 and TR1R3 of this same signal corresponding to the time that has passed between the time of arrival of this signal and the assumed time of its transmission. Module 22 can then estimate the relative distance between modules 20 and 22, and module 24 can estimate the relative distance between modules 20 and 24 (FIG. 6, S2; FIG. 7A: S11).

This information on the time TR1R2, TR1R3 and the corresponding distances will then be transmitted to module 20 (preferably during step c), as indicated below.

The transit time from module 22 to module 24 (TR2R3), and therefore the distance between 22 and 24, may also be estimated in this step by providing, for example, the transmission of a reference frame by module 22. However, for economical reasons, and also because other information must subsequently be transmitted from means 22 to means 24, it is also possible to carry out this measurement or estimation only during step c, as explained above.

Each module 20, 22 and 24 then searches, after a time defined by the protocol with respect to the transmission of the signal 200, for the reference signals 121, 131 (FIG. 8A). These signals 121, 131 are transmitted by the possible buried devices 120, 130 with universal spreading sequence (phase b of FIG. 9) specified by the protocol and different from that used by modules 20, 22 and 24 in search mode. Each module estimates the respective time of arrival of these signals and the time that has passed TV1R1, TV1R2, TV1R3 between said time of arrival and a common local reference time imposed by the protocol via the coordinating module 20 (corresponding in this particular case to the beginning of phase b), (FIG. 7A: steps S13 and S14).

In FIG. 9, only the signal 131 is shown. It is received by modules 20, 22 and 24 at different times, as the transmitter 130 is not generally equidistant from each of these means or modules.

Then, there is the synchronisation on the arrival times of this signal 131 and the demodulation of the data transmitted by the victim(s). This demodulation makes it possible to associate, in each module 20, 22, 24, the time that has passed before the arrival of the signal 131 with the identifier of the victim. The same applies to signal 121.

The information relating to the victim(s) can then be recovered in each of the modules 20, 22, 24 (FIG. 5).

This information (for example, the number of victims, the identifier of the victims and the time of arrival of associated signals) is then relayed, from modules 22 and 24 to module 20, in the form of signals 221 and 241 (FIGS. 8 and 9).

The signal 221 is transmitted by means 22 and arrives at means 20 and 24, respectively, after a transit time TR2R1 and TR2R3 (FIG. 9, phase c). In FIG. 9, the arrows 129 and 133 indicate that the signal 221 contains at least the information relating to TR1R2, the information received by means 22, coming from the victims, in step b, and the information estimated from this signal received from the victims and in particular the information relating to TV1R2 (FIG. 7A: steps S15 and S16).

Similarly, the signal 241 is transmitted by means 24 and arrives at means 20 after a transit time TR3R1 (FIG. 9, phase c).

The arrows 135, 137 and 139 indicate that the signal 241 contains:

on one hand, the information estimated by the means 24 in steps a and b, therefore in particular TR1R3 and TV1R3 (step S17), the useful information received from the victim (identifier, etc.), and on the other hand, the information contained in the signal 221 and received from means 22 in the first part of step c, therefore in particular TR2R3, TR1R2 and TV1R2, and that estimated from the time of arrival of said signal 221 (in particular TR2R3). It is noted that this signal 221 already contained, as explained above, the information received and estimated by means 22 in steps a and b.

In fact, the information relating to TR1R2 and TV1R2 is redundant with the information that means 20 already have, but this can make it possible to refine this information, for example by averaging.

According to this embodiment, in step c, there is advantageously no transmission from means 24 to means 22, since the objective is to get all of the information to means 20 and not to means 22.

The durations TR2R1 and TR3R1 are, in principle, similar or equal to the durations TR1R2 and TR1R3 measured or estimated at the beginning of phase a, but there may be differences associated with uncertainties about the measurement, hence the advantage of having a second estimation in phase c, which makes it possible to refine the estimation of these durations, for example by averaging.

As already indicated above, it is therefore preferably during phase c that the information concerning TR2R3 is estimated or measured then transmitted, by signal 241, to means 20.

The transmission of the signal 221 to means 24 therefore makes it possible, on the one hand, to send the information that these means 22 have to the means 24, but especially to measure the transit time TR2R3.

The distance between 22 and 24 can then be estimated or calculated, for example by means 20 after they have received the information TR2R3.

The module 20 then verifies the validity and the consistency of the data transmitted by modules 22 and 24 and calculates the relative positions of the reference points (modules 20, 22 and 24), as well as the TDOAs, or time differences of arrival of the signals transmitted by the victims, which make it possible to position these victims with respect to the reference points (FIG. 6: step S5-S6; FIG. 7A: steps S18, S19 and S20).

The positions calculated are then displayed on the screen 26 (FIGS. 2A, 2B).

Finally, the rescue worker moves according to the positions calculated, and displayed, and possibly the state of health of the victims.

This search procedure is repeated periodically so as to allow for sufficiently fast updating of the positions estimated as the rescue worker moves. This update is also displayed, thus guiding the rescue worker. The rescue worker can, during phases a, b and c (or a repetition of these phases) remain immobile. He/she can also move during these phases if his/her movement is insignificant with respect to his/her distance from the target.

The method described above consists of:
- the transmission of a reference signal by the first module, and the reception by each of the two other modules of the searching ALVA,
- then the reception, by all of the searching modules, of the signals transmitted by the transmitter to be located, (FIG. 6, step S3),
- and the transmission, from the second and third modules, to the first module, on the one hand, of the information relating to the transit time of the reference signal, and, on the other hand, of the information received and estimated from the signals received from the transmitter to be located (FIG. 6, step S5).

The first module is preferably module 20, which performs calculations of relative positions and displays these positions on the screen.

However, the first module can also be one of the other modules (for example, module 22), the information to be displayed then being transmitted to module 20, equipped with a screen 26. Similarly, the relative position calculations can be made from another module, such as module 22, the result of the calculations being capable of being displayed by this other module or, after transmission, by either of the two others insofar as it is equipped with a screen.

The phase of resynchronisation of the reference modules (FIG. 9: phase a) will be described in greater detail.

In the default state, the three reference modules are connected, but only module 20 is active and functions in transmission mode.

When a search procedure is initiated, modules 22 and 24 are activated, and recover a synchronisation signal generated by module 20 and available by a classic physical link.

The recovery of this synchronisation signal is intended to provide an absolute reference time common to modules 22 and 24 even after the system has been detached.

When the synchronisation signal is recovered, the rescue worker detaches modules 22 and 24 from module 20 and places them on the investigation site, making sure to place them far enough from one another to enable the complete system to make use of good spatial diversity.

To do this, and to save precious time, the rescue worker can optionally throw modules 22 and 24.

Once detached from module 20 and placed appropriately on the site to be investigated, modules 22 and 24 are resynchronised with module 20 (FIG. 7A: step S10).

The latter periodically transmits a specific sequence of encoded pulses known to modules 22 and 24. This sequence is universally known, but different from that used during the default transmission (reserved for victims), in order to resist any interfering UWBs present at the scene (victims). For example, the code that determines the position of the pulses transmitted is different.

An adequate listening window is therefore opened by modules 22 and 24, during this resynchronisation phase, and moved according to a precise search pattern (for example, to perform an exhaustive search) so as to cover the plausible range of distances between module 20 and the other modules (typically from 0 to 30 m). The a priori knowledge of the spreading sequence used in the transmission by module 20 enables modules 22 and 24 to increase the signal-to-noise ratio of the signal to be used, in particular for the synchronisation and demodulation.

Each module can, to this end, implement techniques such as the coherent integration of pulses. These techniques can, for example, be implanted by the means 31 of FIG. 3.

A filter matching the form of the pulse can be used, before or after the coherent integration. This filter can, for example, correspond to a digital processing integrated in the unit 31.

The correlation peak obtained at the output of this matched filter makes it possible to determine the time of arrival of the pulse train transmitted by module 20 with respect to the common reference time.

With the knowledge of the initial synchronisation reference before detachment, and the time of arrival of the signal transmitted, after detachment, by module 20, modules 22 and 24 are capable of determining a new reference time (FIG. 7A: step S11).

This resynchronisation makes it possible to estimate the relative distance in one pass (OWR for One-Way Ranging). The transmission of the synchronisation reference before the detachment makes it possible not only for the free modules to have a new common reference time but also to estimate the distance.

Finally, this resynchronisation phase can be periodically renewed so as to compensate for the drift of the clocks of modules 22 and 24 with respect to the clock of module 20.

Once resynchronised, owing to the preamble of frame 200 transmitted by module 20, and after the detection of the end of the preamble of this frame 200, each module 22, 24 can demodulate the useful data of the frame transmitted by module 20 by referring to the output of its own correlator.

This data can relate to the progress of the search, for example the number of victims and the positions estimated in the previous place or in the previous update.

As regards the phase of detecting and identifying the victims (phase b), once the strict synchronisation has been obtained between the three reference modules, the latter listen for signals transmitted by it, a certain predetermined time after the end of the transmission of the resynchronisation signal of phase a.

Module 20 then switches to receiving mode, for example by switching the switch 48 of FIG. 3. Modules 22 and 24 are already in receiving mode. All of the modules open observation windows following common search patterns, for example when conducting an exhaustive search. The size of a window corresponds to a difference in time (corresponding to a range of distances).

The search is considered to be completed when it has enabled the usual observable range of distances to be scanned (e.g. from 0 to a few hundred meters, for example 500 m, around each module, said distance being a function of a number of parameters such as the thickness of the snow on top of the victims, and/or the frequency of operation, and/or the quality of the receivers, and/or the quality of the antennas).

For each position of the observation window, the spreading sequences used by the buried modules being universal, the reference modules 20, 22, 24 estimate the channel on the basis of the knowledge of these sequences.

They then detect the set of correlation peaks above a set threshold so that the likelihood of false alarms remains below a set value that is reasonable for the application.

This phase makes it possible, at the end of the search and for each reference module, to directly access a number of buried victims.

For each correlation peak obtained, the time that has passed since the absolute common reference time is then determined for the various modules of the system (TOA for Time Of Arrival). On the basis of these new synchronisation times, the reference modules 20, 22, 24 finally demodulate the data transmitted (in signal 131) after the detection of the end of the synchronisation preambles.

This new phase is intended to recover, for each buried device, the identifier of the victim as well as possibly various data on the physiological state of the victim (if the victim is carrying sensors for measuring physiological parameters then transmitted to the device 120, FIG. 8, of the victim).

Insofar as only one spreading sequence is used by the buried devices, collision problems may interfere with the demodulation.

In addition, two buried points located at the same distance from one of the reference modules obviously results in a single correlation peak after estimation of the channel, and can cause an erratic demodulation of the information concerning the victims (according to the relative powers received from the various buried devices).

Figure 10:
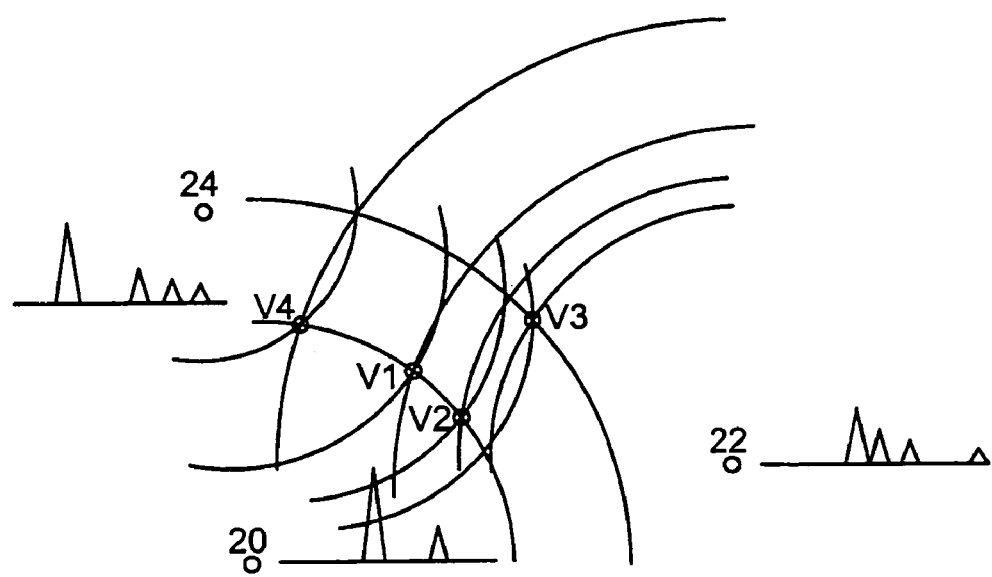
FIG. 10 shows the case of locating multiple victims with a device according to the invention.

However, as shown in FIG. 10, this problem of ambiguity can easily be overcome by any other reference module initially placed differently from the first reference module.

Such a different module will indeed detect two correlation peaks where only one peak is detected in the first module: in FIG. 10, the receiver 20 receives two peaks for the four victims V1-V4, of which three are arranged at an equal distance from said receiver 20, while, for the same victims V1-V4, receivers 22 and 24 each receive four peaks.

All of this information is used in the processing phase in order to locate the victims.

Two co-located buried points will also present this type of problem.

Insofar as a single code is used by the co-located victims, which means the same code for all of the victims, a single correlation peak will be detected, but it will be impossible to perform a reliable demodulation of the useful information, and in particular the identifier, due to synchronous interference problems.

The means 20 will then assign an arbitrary identifier to these co-located victims.

In general, taking into account the spatial diversity, which the system naturally uses (non-alignment of the reference points), if the consensus is not obtained between the reference modules concerning the identification of one or more victims or on the information relating to their physiological state, the system, and in particular the calculation means 31 that must calculate the positions, will take into account the largest number of common information items available at the level of the three reference points defined by the three means 20, 22, 24.

In this way, and by readjusting the parameters of the positioning algorithm, in particular the number of victims, these difficult cases are managed.

However, such cases are relatively marginal and rare, due to the time resolution of the UWB signals, and do not cast doubt on the general functioning of the system.

In the phase of retransmission of the arrival times and formation of the differences in these arrival times (phase c), modules 22 and 24 retransmit to module 20, a certain predetermined time after the end of the exhaustive search and the demodulation of the data, the data on the victims (identifier, arrival time, etc.).

This transmission preferably uses specific spreading sequences (sequence c) and is used on time ranges defined by module 20 in the transmission of the first reference signal (phase a), so as to avoid any interference with UWB signals present in the search area.

The central module 20 then forms the time differences of arrival (TDOA) and applies an algorithm capable of determining the position of all of the points of the scene (reference and unknown buried points) from these time differences.

The carrier of module 20 can then use the geometric representation of the scene available on the screen in order to orient his/her searches (display of his/her position and that of the two other reference points and unknown points).

The three phases (a, b and c) can then be repeated periodically in order to re-update the positions estimated during the movement of module 20.

At the end of the procedure described above, the reference module 20 has the following data:

relative distances between the reference modules: $d_{R1R2}$, $d_{R1R3}$, $d_{R2R3}$ from the transit times TR1R2, TR1R3, TR2R3, allowing for a prior positioning of the reference points, differences in relative distances: $d_{V1R1}$-$d_{V1R2}$, $d_{V1R2}$-$d_{V1R3}$, $d_{V1R1}$-$d_{V1R3}$ from the transit times TV1R1, TV1R2, TV1R3, enabling the victim to be positioned with respect to the reference points.

Examples of the algorithm for relative positioning of reference modules are described in the document of J. Caffery and al. "Subscriber location in CDMA cellular networks", Vehicular Technology, IEEE Transactions, Vol. 47, May 1998, p. 406-416.

As regards the positioning of the victims, TDOA measurements can be used.

In the case of the absolute positioning of an unknown point in a three-dimensional space, four reference points are used, of which the absolute positions are known beforehand. In spite of everything, a two-dimensional approximation can be used in a search for victims exclusively in an X-Y plane, or more specifically with a projection of points in the plane of the snow-covered slope. In this case, three reference points make it possible to ensure the unicity of the solution.

However, according to this invention, we do not have any preliminary stationary reference or any preliminary knowledge of the absolute positions of the reference points.

In reality, since the coordinates of the reference points are unknown, they can be considered to be unknown mobile points for a first step.

By default, and arbitrarily, the position (0, 0) in the plane (X, Y) is assigned to one of the reference points, preferably a stationary module 22 or 24 so as not to re-update the complete set of coordinates when moving module 20, which makes it possible to eliminate a degree of freedom. For example, below, we will choose module 22 as position (0, 0).

Figure 11:
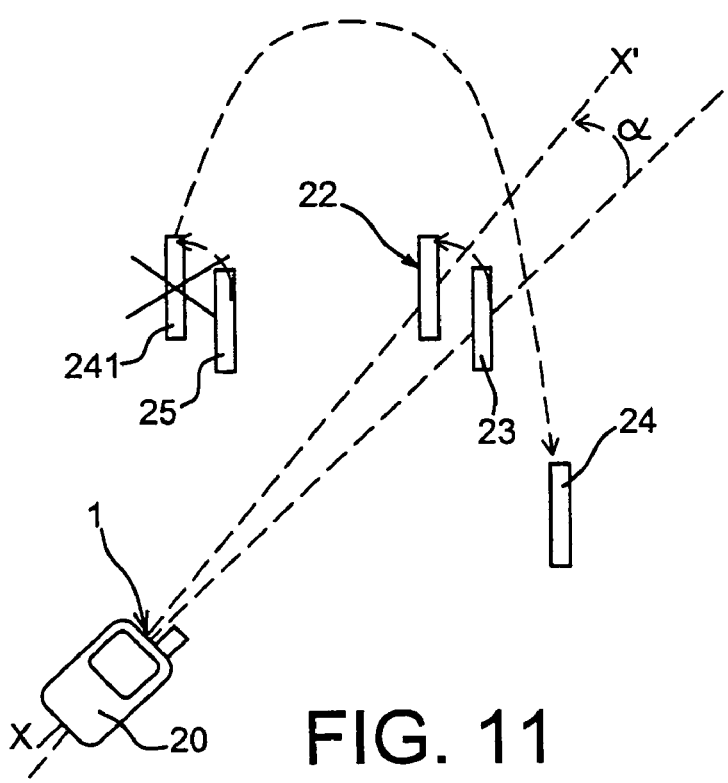
FIG. 11 shows the choice of a reference orientation.

As shown in FIG. 11, two degrees of freedom remain: a possible rotation of the set of points in azimuth (represented by the angle α in FIG. 11), and a symmetry around an axis XX' passing through two of the modules 20, 22 (FIG. 11). In addition, by default, it is possible to adopt positioning conventions concerning the reference points so as to obtain a single solution for the placement of these reference points.

Advantageously, these conventions will make it possible to obtain a match between the positions displayed on the screen of module 20 and the reality of the ground so as to facilitate the rescue worker's movements.

It is possible, for example, to choose, when moving modules 22 and 24 upon the initiation of the search procedure, to place module 22 in front of the rescue worker (i.e. module 20), and module 23 systematically to the right thereof, if this same convention is used in the display on module 20 (with a point 23 systematically to the right of the axis 20, 22).

Advantageously, the rescue worker will place module 22 on the ground in the direction given by the direction of points 20 and 22 displayed on the display screen. In this way, his/her movement over the ground can constantly be matched with the movement of the corresponding point displayed on the screen.

The unicity is therefore recovered naturally.

It should be noted that this method of recovering the unicity by means of positioning conventions and visual adjustment of the azimuth in no way affects the precision of the relative positioning of the points. It is useful only for facilitating the rescue worker's movements.

In any case, it is the rescue worker's responsibility to move in the system described (with the assistance of the display). In addition, this movement can be managed in a relative manner, without adversely affecting the precision of the system.

Once the reference points have been positioned, the positioning of the potential victims should be calculated.

As regards the positioning of the victims, all types of positioning algorithms based on measurements of differences in arrival time, not requiring specific constraints on the relative position of the reference points, can be applied in the context of this invention.

Examples are given in the documents entitled "A simple and efficient estimator for hyperbolic location" of Y. T Chan et al., IEEE Transactions Acoustic, Speech and Signal Processing, Vol. 42, August 1994, p. 1905-1915 and "An improved Taylor algorithm in TDOA subscriber position location", of Xiong Jin-yu, Wang Wei and Zhu Zhong-liang, Proceeding of the Int. Conf. on Communication Technology, 2003, Vol. 2, 9-11 April 2003, p. 981-984.

Unlike the previous phase in which the reference points are positioned, in which the data set was constituted by relative distances, differences in relative distances are used.

At this stage, techniques such as linearization by Taylor series development or the Chan algorithm, for the positioning of a point based on a TDOA set (Time difference Of Arrival) are used.

According to another feature of the invention, any additional rescue worker dispatched on the site and carrying a complete device (a set of three transceivers 20', 22', 24') must preferably be capable of participating in the search procedure, even without being the initiator thereof, either by leading his/her own independent search simultaneously with that of the first rescue worker, or by assisting the latter by providing a fourth reference point.

In the first case, the second set is identical or similar to the first set as described above in association with FIGS. 2A, 2B and 3. It is shown in the presence of the first set in FIG. 8B in the detached state.

In the second case, the additional device 20' intervenes without being accompanied by two other devices 22', 24'. It is then attached to the first three devices and is synchronised with them as described below.

The additional UWB device 20', or the main UWB module 20' of this second set of searching devices, first switches to receiving mode and then seeks to be synchronised on the reference signal transmitted, during one of the phases a' of a cycle, which will be described below, by the main module 20 of the first device, which initiates the search.

This possibility for synchronisation of a fourth transceiver or a second ALVA again justifies the use of a universal spreading sequence for phase a'.

Once synchronised, the reference time obtained by module 20' is then a relative reference time.

Consequently, a two-way cooperative procedure (Two-Way Ranging) can therefore be implemented in order to obtain a strict synchronisation of means 20' with means 20.

An additional time range is therefore provided before phase b' for detecting victims in order to enable this additional rescue worker to join the system and contact the initiator 20.

An acknowledgement signal (ACK) can be generated by means 20 intended for means 20'. These latter are then confirmed in their adherence to the searching device, and can estimate the relative distance that separates them from means 20 owing to the two-way dual link.

There is thus an absolute reference time, common with the other reference points 20, 22, 24, enabling all four modules to participate in the actual search phase b'.

Therefore, 20' can participate in this new search phase as a fourth reference point for the first initiating device and initiates its own phase for detecting victims, estimating arrival times, before relaying this information to means 20 (phases b' and c').

In spite of everything, this new reference 20' is also to be located in the reference defined by 20, 22 and 24.

Thus, the information on the relative distance between means 20' and each of means 20, 22 and 24 is determined before calculating the positions of the victims.

It is possible, for example, to use (in the same way as above in the case of a single rescue worker) the retransmission, to means 20, of arrival time information during phase c'.

Figure 7B:
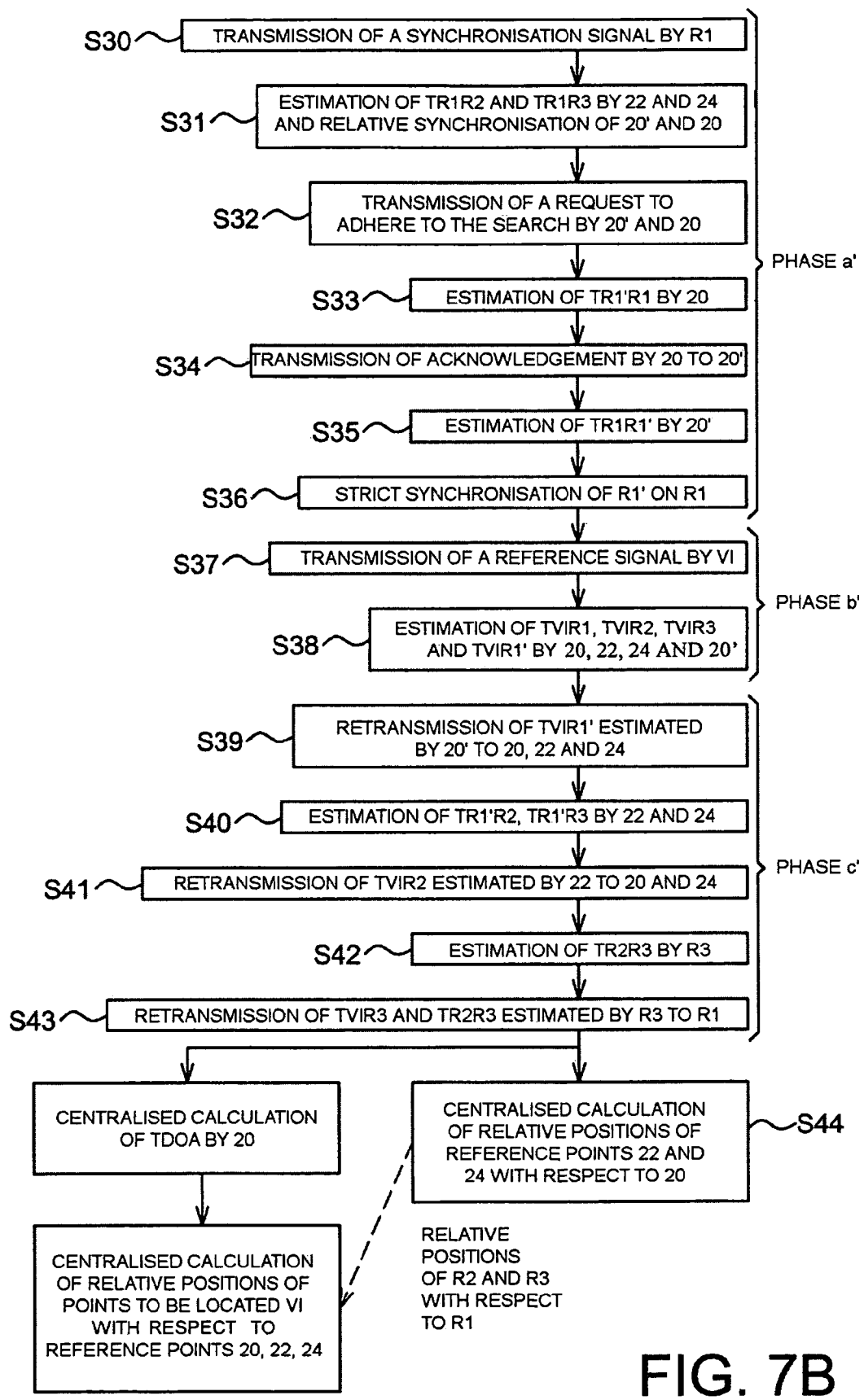
FIG. 7B is a diagrammatic description of an embodiment according to the invention, in the case of multiple rescue workers.

A procedure implementing four searching transceivers will be described in association with FIGS. 7B and 12.

During phase a'1, a first signal 2000 is transmitted by module 20 (FIG. 7B: step S30) and detected by modules 22, 24 and 20' after, respectively, a duration TR1R2, TR1R3 and TR1R1' (step S31). The protocol can set a duration D for this phase a'1 based on the transmission of signal 2000.

Means 22 and 24 can then estimate the durations TR1R2 and TR1R3.

At the end of the duration D after the transmission of signal 2000, phase a'2 begins. This phase corresponds to a time range allowed for the adherence of a new reference point 20' and the acknowledgement thereof by the coordinating module 20.

In the example provided, the device 20' wants to join the search coordinated by 20. However 20' does not know, even after having received signal 2000, the time reference of 20 (corresponding to the beginning of the transmission of the frame 2000). It knows only the arrival time of this frame 2000. It deduces therefrom that the phase a' 2 begins, at the latest, a time D after this arrival time (case corresponding to the case in which TR1R1' is zero and points 20 and 20' are coincident). It therefore knows that at the time corresponding to the time of reception of 2000+D, it can transmit its request for adherence 2000'. This time also corresponds to the effective starting time of phase a'2 plus TR1R1' in the reference time of the coordinator (the transit time between 20 and 20'), 20 receives this adherence request 2000' at the end of a duration TR1R1' after the beginning of the transmission of the latter and transmits an acknowledgement frame 2001, a duration TACK after the beginning of the reception of 2000'. This duration TACK is set by the protocol and is therefore known in particular by 20'. It is short enough to limit the influence of the relative drift of the clocks of 20 and 20' and thus not to significantly affect the estimation of the relative distance between 20 and 20' as well as the strict resynchronisation of 20' on 20.

Device 20' receives frame 2001 at the end of a duration TR1R1' after its transmission. It can then estimate the time that has passed between the transmission of its adherence request (signal 2000') and the reception of this acknowledgement (signal 2001). This duration corresponds to TACK+2 TR1R1'. Based on this time passed, it can therefore deduce TR1R1'.

The strict synchronisation of means 20' with means 20 is then terminated (step S36).

In phase b', each of the four transceiver modules of the searching group can detect a signal 1310 or signals transmitted by the device carried by a victim, respectively after a duration TV1R1, TV1R2, TV1R3 and TV1R1' with respect to a reference time common to the four modules, for example, the beginning of phase b' imposed by the protocol via the coordinator 20 (step S37). Each of these devices Ri can therefore estimate the duration TV1Ri (step S 38).

There is then a synchronisation on the arrival times of this signal and a demodulation of the data transmitted by the victim(s). This demodulation makes it possible to associate, in each module 20, 22, 24, 20', the arrival time of the victim's signal with the victim's identifier (step S38).

The information relating to the victim(s) can then be recovered in each of the searching modules.

Figure 12:
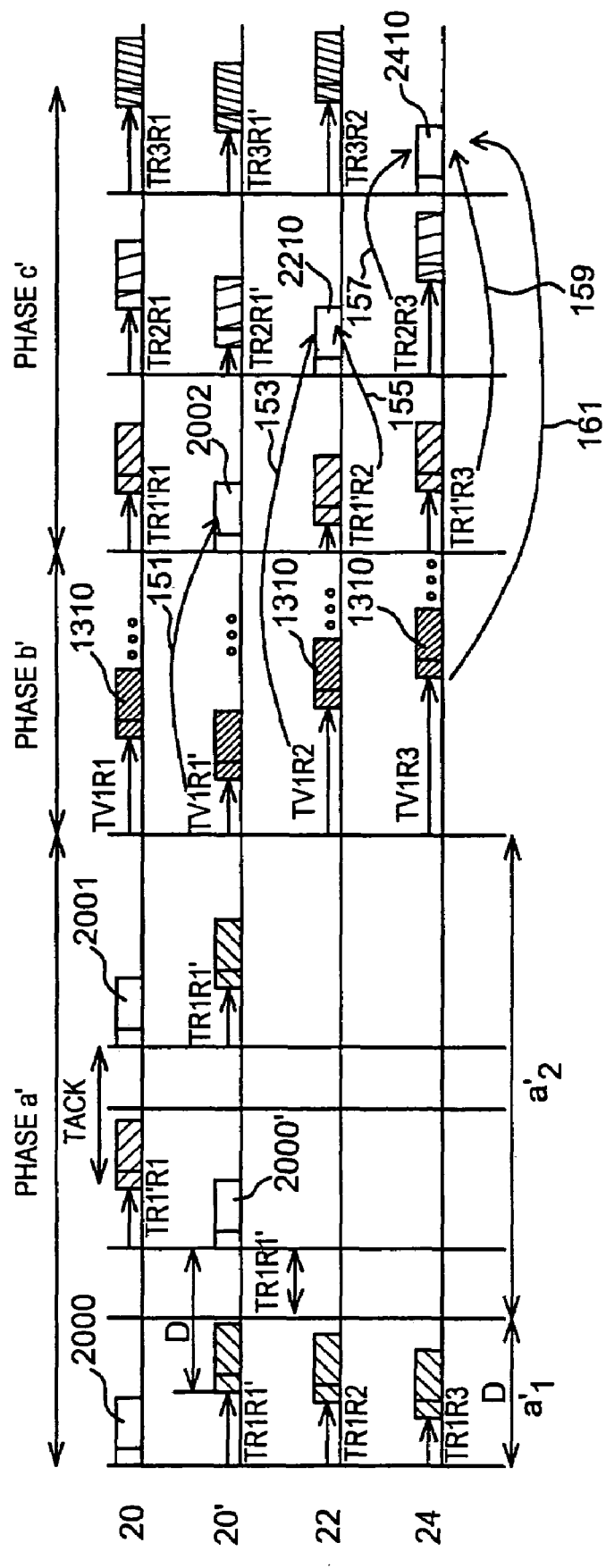
FIG. 12 shows the exchanges of information in the intervention of a second rescue worker.

This information (for example, number of victims, identifier of the victims and arrival time of the associated signals) is then relayed, from modules 22, 24 and 20' to module 20, in the form of signals 2002, 2210, 2410 (see FIG. 12, phase c').

Signal 2002 is transmitted by means 20' and reaches means 20, 22 and 24 respectively after durations, or fourth, fifth and sixth transit times TR1'R1, TR1'R2, and TR1'R3 (FIG. 12, phase c'; FIG. 7B: step S39). TR1'R2 and TR1'R3 can then be estimated respectively by means 22 and 24 (step S40).

In FIG. 12, the arrow 151 indicates that the useful part of the frame 2002 contains at least the information relating to TV1R1'.

Similarly, signal 2210 is then transmitted by means 22 and reaches means 20, 20' and 24 respectively after durations, or seventh, eighth and ninth transit times TR2R1, TR2R1' and TR2R3.

Arrows 153 and 155 indicate that the signal 2210 contains at least:
- in the one hand, the information estimated by means 22 in phase b', therefore in particular TV1R2 (step S41),
- in the other hand, the useful information contained in the signal 2002 and received from means 20' in the first part of step c', for example TV1R1', as well as the information estimated by 22 based on the time of reception of the frame 2002, for example TR1'R2.

In a final part of phase c', a signal 2410 is transmitted by means 24 and detected by modules 20, 20' and 22 after, respectively, a duration, or tenth, eleventh and twelfth transit times TR3R1, TR3R1', TR3R2.

In FIG. 12, arrows 157, 159, 161 indicate that this signal 2410 comprises in particular information relating to TR2R3, TR1'R3 and TV1R3 (step S43).

Durations TR1'R3 and TR3R1', like durations TR2R3 and TR3R2, are in principle identical or similar to one another, but there may be differences, associated with the uncertainties of measurement, thus the advantage of having a second estimation in phase c' which makes it possible to refine the estimation of these times, for example by averaging.

As indicated above, it is in phase c' that the information concerning TR2R3 is estimated or measured, then transmitted, by signal 2410, to means 20.

The transmission of signal 2210 to means 24 therefore makes it possible, on the one hand, to send the information that means 22 have to means 24, but, in particular, to measure the transit time TR2R3.

The distance between 22 and 24 can then be estimated or calculated, for example by means 20 after the latter have received the information TR2R3.

Module 20 can then verify the validity and consistency of the data transmitted by modules 22, 24 and 20' and calculate the relative positions of the reference points 20, 20', 22 and 24, as well as the differences in arrival time of the signals transmitted by the victims, which make it possible to position said victims with respect to the reference points 20, 20', 22, 24.

An extension to the case of n rescue workers for this joint (centralised) search mode can be provided by using techniques of synchronisation, access to the network and sharing of time resources (protocol) described above by way of example for the case of two rescue workers.

The provision of an additional reference point makes it possible, on the one hand, to reduce the error on the estimated positions of the victims by introducing a redundancy of information concerning the Euclidean conformity of the structure, and, on the other hand, to reduce the search time with the intervention of an additional rescue worker.

However, the second rescue worker or the second set of detectors 20', 22', 24' can also initiate a completely independent search procedure in parallel with the first set 20, 22, 24 by using, in phases a' and c', spreading sequences different from the sequence used by the first set 20, 22, 24, in phases a and c, so as to limit the interference between the searching devices working in parallel. It is of course possible to generalise to N independent rescue workers working in parallel.

Thus, it is possible to define universal tables of codes known by any additional rescue worker intervening after the initiation of a first search procedure with a preferential order. In the case of an extended scene, given the large ranges available in UWB, all of the victims can be detected by each of the reference points (including by those of the new rescue workers), but the uncertainty about the estimated positions of the victims is greater the farther they are from the searching devices in a joint multiple rescue worker search mode (centralised mode). Therefore, the parallel search mode makes it possible to reduce this uncertainty by working in parallel on a plurality of smaller scenes.

Given the propagation context envisaged, (low band or high band of the RF spectrum), it is entirely plausible to envisage the presence of the direct geometric path, LOS (Line Of Sight), systematically. It is therefore possible to disregard the presence of multiple paths, in the absence of reflective elements or obstacles in the environment.

Snow is indeed a composite mixture of ice and air, of which the real part of the permittivity varies with the pressure of the snow (typically from 1.5 to 3). It is observed that, with a given water content, the real part of the relative permittivity decreases and the imaginary part increases with the frequency, which results in an increase in losses. The water contained in wet snow will strongly attenuate the wave, and all the more so as the frequency is high.

Depending on the time of year, all types of snow can be encountered in an avalanche, but, to delimit the study, two very different cases can be distinguished: dry snow and wet snow, the less favourable case being that of wet snow. It is therefore possible to formulate two hypotheses for the transmission budget according to the type of snow encountered (dry or wet) and consider the corresponding moisture content $W_V$ (table I below). The imaginary part of the permittivity (i.e. the losses) is very low if the snow is dry enough. The propagation of a UWB wave transmitted in the low band is therefore highly favourable in dry snow, and the system works optimally in this situation. In any case, a preliminary calibration of the devices for various conditions of snow, and for known distances, can be performed.

TABLE I

Attenuation undergone by a wave at 1.25 GHz,
and a transmission through 1, 2 and 10 m of snow.

| | Type of snow | | | | | |
|---|---|---|---|---|---|---|
| | Dry/Not very wet $W_v = 0.6\%$ | | | Wet $W_v = 3\%$ | | |
| Snow passed through (m) | 1 m | 2 m | 10 m | 1 m | 2 m | 10 m |
| Attenuation at 1.25 GHz (dB) | 1 | 2 | 10 | 11 | 22 | 110 |

In reality, the propagation conditions are better as the frequency is reduced. Insofar as a low frequency range is used at the outset, the link budget is therefore clearly favourable (only the frequency components transmitted highest are capable of being strongly attenuated).

Even if, statistically, the average depth of burial is usually less than 2 m, causing relatively low losses, it is necessary to take into consideration the planar approximation of the area to be investigated (the estimated distances are seen in a pseudo-plane defined by the devices framing the area).

Usually, a large distance is potentially covered by the wave in the snow cover. Typically, for a UWB searching module carried by a rescue worker at a height of 1.5 m, a UWB module buried at a depth of 1.5 m and a distance separating them in the X-Y plane of 10 m, the distance actually covered by the wave will be more than 10 m. Finally, it should be noted that only the links concerning the buried device (from the buried device to the reference points) will be affected by such attenuations, the other links (from reference points to reference points) taking place in free space. It is possible, for example, to choose to adjust the length of the integration code and therefore to adjust the length of the synchronisation preamble, or the useful bandwidth in the frame according to the meteorological conditions, so as to compensate for this strong attenuation due to this passage through the snow cover.

Figure 13:
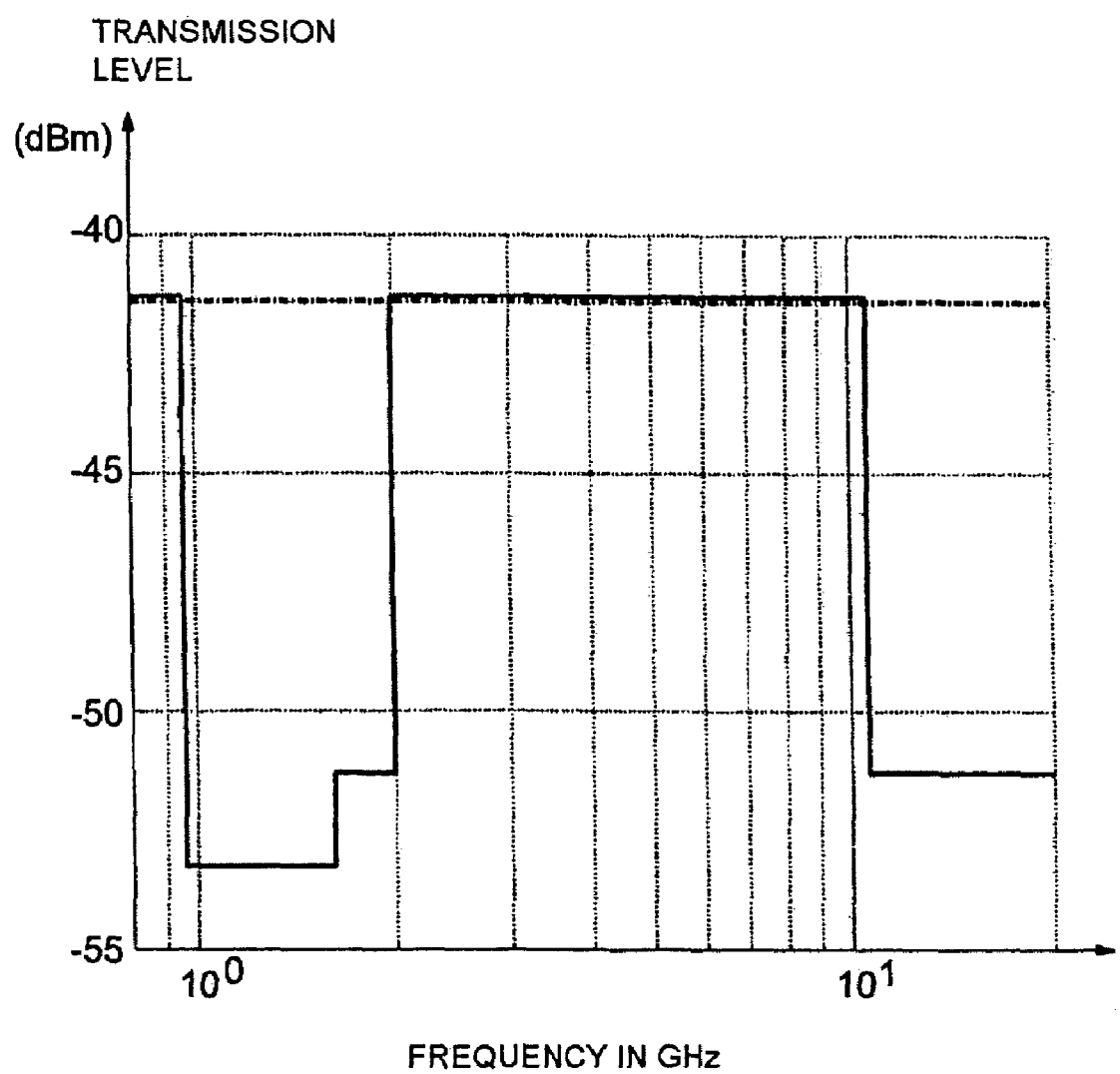
FIG. 13 shows an FCC mask for external UWB applications.

An example of an application will be provided according to the last document of the FCC, for applications associated with security, of the radar imagery and penetration radar-type operating below 960 MHz; the general rules of the FCC part 15 are applied. FIG. 13 shows an FCC mask for outdoor UWB applications.

In the context of our application, if we consider a band between 10 MHz and 960 MHz, i.e. a band with a bandwidth of 950 MHz (Fc=475 MHz), the average power allowed is:

$P_m = 10 \text{ Log}(950) - 41,3 = -11.3 \text{ dBm}$

If we now consider a UWB link at 10 kbits/s, the thermal noise floor is then:

$P_b = -174 + 10 \text{ Log}(10^4) = -134 \text{ dBm}.$

To ensure a BER (Bit Error Ratio) of $10^{-3}$ on the link with a modulation of 2 PPM, the ratio Eb/N0 is 12.5 dB.

The losses due to the defects of the hardware implementation are estimated at 3 dB.

The noise factor of the receiver is estimated at 5 dB when considering a low-cost receiver in this band (GSM # 1 to 2 dB).

The antennas are considered to be omnidirectional and have a zero gain.

In this configuration, the system is capable of functioning for an attenuation between the transceiver antennas of:

Attenuation=−11.3−12.5−3−5−(−134)=102.2 dB

If we consider a propagation in free space, the attenuation is:

Attenuation=20 Log(4.pi.d.Fc)−20 Log (C), with d being the distance between the antennas, Fc being the central frequency and C being the speed of light.

Thus,

20 Log(4.*pi.d.Fc*)=102.2+20 Log(*C*)=271.7424

Thus, the link described above can be ensured for ranges reaching up to d=6.47 Km if the propagation conditions in free space are satisfied.

This ensures a sufficient range, even in cases of poor weather between the reference points and the terminals of the rescue workers.

We will now consider the case of UWB radio links between the transmitter of the victim and the reference modules 20, 22, 24, for which a part of the propagation takes place in the snow cover. In the least favourable hypothesis, i.e. for the highest frequency of the band occupied band and wet snow (Wv=5%), a loss of 8.2 dB/m (f=1 GHz) is added.

Typically, for 3.65 m of snow passed through, the high frequencies of the occupied band undergo an additional loss of 30 dB due to the presence of wet snow, i.e.

Attenuation=102.2−30=72.2 dB

20 Log(4.*pi.d.Fc*)=241.7424 and a range d=204.7 m

For 5 m of wet snow, we therefore add an additional 40 dB, resulting in a range of d=64.74 m, For 6 m of wet snow, we therefore add an additional 50 dB, resulting in a range of d=20.47 m.

For this latter case (6 m of wet snow), it is possible that the link involving the victim's UWB device is not provided (under the aforementioned modulation hypotheses); it is then appropriate to methodically scan the entire slough in order to enter the area of coverage, 20 m around the victim.

In fact, it is an extremely unfavourable case for which the data necessary for the calculations is available (in particular concerning the propagation in the snow cover), the central frequency of the device being capable of being around 475 MHz.

However, wet snow avalanches are not the most deadly, because their release can be more easily predicted than slab avalanches composed of snow that is much drier.

Finally, calculations were carried out to ensure a given error ratio on the data transmitted, but they can be dissociated from the phase of synchronisation and estimation of the channel ensured by the single detection of the preamble.

Consequently, it is possible to adjust the length of the sequence of the synchronisation preamble in order to obtain a sufficient integration gain.

According to the invention, a single portable device can, on request, switch from the status of an unknown point to be located (one transmitter point) to the status of a full search infrastructure (three transceiver reference points), by contrast with the conventional approach in which the infrastructure is set once and for all.

This invention enables the relative positioning (with respect to the rescue worker) of multiple devices buried under the snow in the absence of an infrastructure (i.e. in the absence of stationary reference points of which the positions are known beforehand).

It also enables the relative positioning (with respect to the rescue worker) of multiple devices buried under the snow from a single compact and polyvalent device, operating indifferently in search mode (rescue worker), or in alert mode (victim).

It also enables the rapid relative positioning of multiple devices buried under the snow, with the suppression of the three search phases of the ARVA.

Figure 7C:
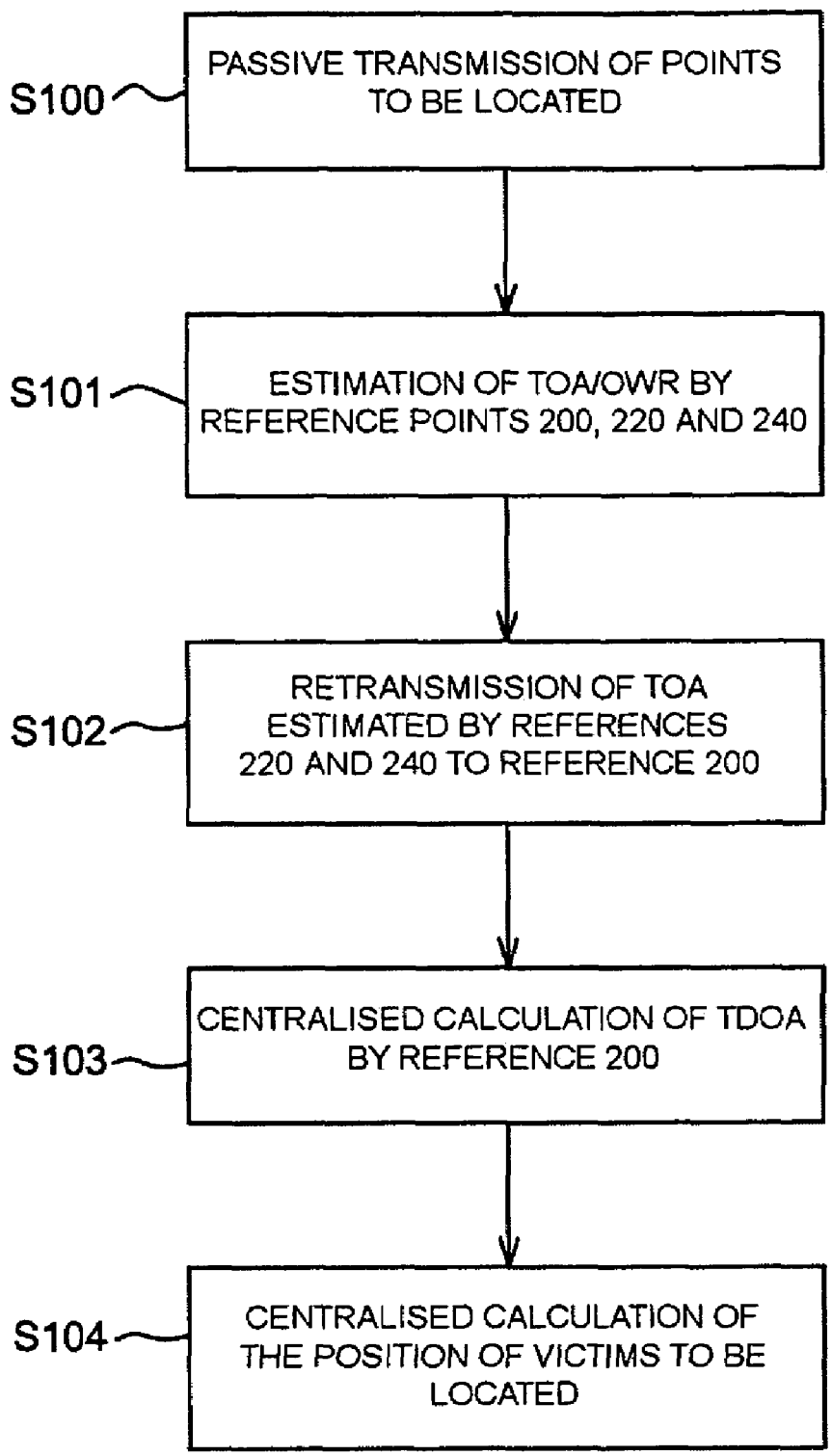
FIG. 7C is a diagrammatic description of a method according to the prior art.

FIG. 7C shows a conventional radiolocation method based on the TDOA as implemented in the prior art. Such a method uses stationary reference points 200, 220, 240 of which the positions are known beforehand. This immediately distinguishes this method from a method according to the invention, in which the reference points are not stationary and their position is not known beforehand.

According to a first step (S100), there is first a passive transmission from the points to be located to the reference points.

Next, an estimation is performed by reference points 200, 220 and 240, of the arrival times of the signals transmitted by the points to be located.

These durations are retransmitted by means 220 and 240 to means 200 (step S102).

A centralised calculation of the TDOA times is then performed by means 200 (step S103).

After the calculation of the TDOAs (Time Difference Of Arrival), the positions of the points to be located are calculated (step S104).

This method does not apply to an occasional and uncommon scene, unlike the invention.

A compact device according to the invention also allows for a natural synchronisation of the UWB modules for the search phase, associated with the configuration of the device (integrated set of UWB modules in the default state).

Finally, the invention is very flexible to implement with numerous possible search modes, depending on the available rescue resources:

single rescue worker search multiple rescue worker search, and, in this case joint searches (centralised searches), parallel searches (multiple independent searches).

The precision is increased with the increase in the number of rescue workers.

A display of the full scene, by means of display means 26 (FIG. 2B), enables direct access to the closest victim by the shortest path.

The apparatus can be oriented in any way during the search phases, unlike the ARVA.

Advantageously, the apparatus is oriented so as to make the points displayed on the display screen correspond with the reality of the ground, in order to facilitate the rescue worker's movements.

Electromagnetic disturbances, associated with inter-victim interferences, can also be avoided, by contrast with the case of the ARVA.

Any sound disturbances on the scene, with multiple rescue workers, are also avoided, as the device does not use a loudspeaker, unlike the ARVA.

Also by contrast with the ARVA, the invention enables:

a search for victims over large areas owing to the large range of the device, a display of useful information (relative positions, possible information on the state and number of victims), simple and user-friendly handling, requiring no special training, a possible classification and order of priority for the rescue of victims, according to various criteria such as the state of health (potential coupling with DETAV).

According to other embodiments, it is possible to add:

an additional reference point (i.e. an additional UWB transceiver module for each device) allowing for a three-dimensional location of the victims, and therefore having additional information on the depth of burial of the victim, the integration of GPS modules (for an absolute positioning and the synchronisation of reference points) making it easier to obtain unicity of the solutions, the integration and processing of classic ARVA signals so as to ensure an easy equipment transition.

A device according to the invention comprises data processing means (means 31 of FIG. 3, for example) programmed to implement any method according to the invention.

Each of modules 20, 22, 24 of a device according to the invention is equipped with means 31 programmed to implement the reception and/or the transmission and/or the processing and/or the transfer of signals or information or data to one or more of the other modules according to one of the methods described above.

The invention claimed is:

1. A method for locating a UWB transmitter, without a previously-set position reference, using at least one first set of n UWB searching transceivers, n≧3, said method comprising:

A) synchronizing the UWB searching transceivers in a grouped state, deploying the searching transceivers at different points, and estimating the relative distances between the searching transceiver;

B) receiving, by the transceivers, signals transmitted by the transmitter to be located;

C) calculating, by the transceivers, respectively, n durations between arrival time of signals transmitted by the transmitter to be located, and a reference time common to the searching transceivers;

D) then, transmitting, to one of the transceivers, the durations calculated, relating to the signals transmitted by the transmitter to be located and received by the other transceivers;

E) calculating the relative position, with respect to the searching transceivers, of the transmitter to be located according to the time of travel of the signals, transmitted by the transmitter to be located, to the searching transceivers, and said relative distances between the searching transceivers.

2. A method according to claim 1, wherein the UWB signals used have a frequency range of less than 1 GHz.

3. A method according to claim 1, wherein the pulse frames transmitted comprise a synchronization preamble, a delimitation of the preamble, then useful data.

4. A method according to claim 1, wherein the method further comprises, before the synchronizing A), synchronizing the searching transceivers in an attached state.

5. A method according to claim 1, further comprising displaying points at which the transceivers are located and the transmitter to be located.

6. A method according to claim 1, wherein each searching transceiver implements, in the receiving B), one or more observation windows each corresponding to a range of distances.

7. A method according to claim 6, wherein all of the distance ranges enable a distance range between 0 and a few hundred meters around each transceiver to be covered.

8. A method according to claim 1, wherein the method comprises refreshing, by a repetition of A), B), and C), the position of the transmitter to be located.

9. A method according to claim 1, wherein the C) for calculating the position of the transmitter to be located provides a position in a two-dimensional surface.

10. A method according to claim 1, wherein one of the transceivers is moved with respect to the other two transceivers.

11. A method according to claim 1, further comprising:
transmitting, by a first transceiver, a reference signal, and reception of the reference signal by the other transceivers;
receiving, by the searching transceivers, signals transmitted by the transmitter to be located;
transmitting, to the first transceiver, information relating to times of arrival of the reference signal and the signals transmitted by the transmitter to be located.

12. A method according to claim 1, wherein the synchronization A) comprises:
transmission of a reference signal from the first transceiver to the other transceivers, and
estimating or calculating, by the other transceivers, of the transit times of the reference signal to themselves.

13. A method according to claim 1, further comprising:
transmitting, by a first transceiver to the other transceivers, a signal comprising at least:
a second duration, calculated by the second transceiver, a second transit time of the reference signal; and
calculating or estimating, by a third transceiver, a third transit time from the second transceiver to the third transceiver, equal to the transit time of the signal transmitted by the second transceiver.

14. A method according to claim 13, further comprising calculating or estimating, by the first transceiver, a transit time from the second transceiver to the first transceiver, equal to the transit time of said signal transmitted by the second transceiver to the first transceiver.

15. A method according to claim 1, further comprising:
transmitting by a third transceiver, to at least a first transceiver, a signal, comprising at least:
a third transit time from the second transceiver to the third transceiver,
a third duration calculated by the third transceiver, and
a third transit time of the reference signal.

16. A method according to claim 15, further comprising calculating or estimating, by the first transceiver, a transit time from the third transceiver to the first transceiver, equal to the transit time of the signal transmitted by the third transceiver to the first transceiver.

17. A method according to claim 1, wherein an additional transceiver is synchronized with the first set of at least three transceivers and positioned with respect to the at least three transceivers.

18. A method according to claim 17, wherein the first set of transceivers includes three transceivers and the additional transceiver is a fourth transceiver.

19. A method according to claim 18, further comprising:
transmitting, by the first transceiver, a reference signal;
receiving, by the four searching transceivers, signals transmitted by the transmitter to be located;
transmitting, to the first transceiver, information relating to transit time of the reference signal and to times that have passed between an arrival time of the signals transmitted by the transmitter to be located and a reference time common to the four transceivers.

20. A method according to claim 18, wherein the synchronizing A) comprises:
transmitting a first reference signal from the first transceiver to the second, third, and fourth transceivers,
estimating or calculating, by the second and third transceivers, the transit times of the reference signal to the second and third transceivers,
synchronizing the fourth transceiver with the first transceiver, and estimating or calculating, by the fourth transceiver, the transit time of a signal between the first and the fourth transceivers.

21. A method according to claim 20, further comprising:
transmitting, by the fourth transceiver, an adherence request signal;
then transmitting, by the first transceiver, an acknowledgement signal, and
calculating, by the fourth transceiver, the transit time of the acknowledgement signal from the first transceiver to the fourth transceiver.

22. A method according to claim 18, further comprising, between B) and C):
calculating by the first, second, third, and fourth transceivers, respectively, a first, a second, a third, and a fourth duration between the times of reception by the transceivers of signals transmitted by the transmitter to be located, and a reference time common to the four transceivers,
then, transmitting, to the first transceiver, the second, third, and fourth calculated durations.

23. A method according to claim 22, further comprising:
transmitting, by the fourth transceiver to the first, second, and third transceivers, a signal comprising at least the fourth duration calculated,
calculating or estimating, by the first, second, and third transceiver, respectively, a fourth, fifth, and sixth transit time from the fourth transceiver to the first, second, and third transceivers, equal to the transit time of the signal transmitted by the fourth transceiver.

24. A method according to claim 23, further comprising:
transmitting, by the second transceiver to the first, third, and fourth transceivers, a signal comprising at least:
the second duration calculated by the transceiver signal, and
the fifth transit time;
calculating or estimating, by the first, third, and fourth transceivers, respectively, a seventh, eighth, and ninth transit time from the second transceiver, respectively, to the first, fourth, and third transceivers, equal to the transit time of the signal transmitted by the second transceiver to each of the first, third, and fourth transceivers.

25. A method according to claim 24, further comprising:
transmitting, by the third transceiver to the first, second, and fourth transceivers, a signal comprising at least:
the third duration calculated by the third transceiver,
a sixth transit time, and
a ninth transit time;
calculating or estimating, by the first, second, and fourth transceivers, respectively, a tenth, eleventh, and twelfth transit time from the third transceiver, respectively, to the first, fourth, and second transceivers, equal to the transit time of the signal transmitted by the third transceiver to each of the first, fourth, and second transceivers.

26. A method according to claim 18, wherein the fourth transceiver is part of a second set of three transceivers.

27. A method according to claim 1, wherein a second set of at least three transceivers implements A) through E) in parallel with, or independently of, the first set.

28. A method according to claim 1, wherein the transmitter to be located is buried under snow.

29. A method according to claim 28 wherein, in E), a correction is made to take into account delays in times of arrival due to the propagation of signals in the snow.

30. A Method according to claim 1, wherein the transceivers use, in the transmission, by default, identical spreading sequences.

31. A device for locating a UWB transceiver, comprising at least three searching transceivers, programmed to implement a method according to claim 1.

* * * * *